US012702977B2

(12) United States Patent
Amadio et al.

(10) Patent No.: US 12,702,977 B2
(45) Date of Patent: Aug. 11, 2026

(54) SYSTEMS, DEVICES, METHODS, AND COMPUTER-READABLE MEDIA FOR ANALYSIS OF BODILY FLUIDS AND METHODS FOR ITS USE IN CLINICAL DECISION-MAKING

(71) Applicant: JPAV, LLC, Austin, TX (US)

(72) Inventors: Jordan Paul Amadio, Austin, TX (US); Ryan Joseph Benavides, Pasadena, CA (US); Arjun Kumar Menta, Plano, TX (US); Matthew Junkit Yu, Plano, TX (US)

(73) Assignee: ILYNX LLC, Sheridan, WY (US)

( * ) Notice: Subject to any disclaimer, the term of this patent is extended or adjusted under 35 U.S.C. 154(b) by 767 days.

(21) Appl. No.: 17/994,265

(22) Filed: Nov. 25, 2022

(65) Prior Publication Data

US 2023/0106018 A1 Apr. 6, 2023

Related U.S. Application Data

(60) Provisional application No. 63/248,517, filed on Sep. 26, 2021.

(51) Int. Cl.
*B01L 3/00* (2006.01)

(52) U.S. Cl.
CPC . *B01L 3/502715* (2013.01); *B01L 2300/0663* (2013.01); *B01L 2400/082* (2013.01)

(58) Field of Classification Search
CPC ....... B01L 3/502715; B01L 2300/0663; B01L 2400/082; A61B 5/0022; A61B 5/1455; A61B 5/4064; A61B 5/407; A61B 2562/0204; A61B 2562/0261; A61B 2562/0271; A61B 5/14507; A61B 5/0075
See application file for complete search history.

(56) References Cited

U.S. PATENT DOCUMENTS

| | | | | |
|---|---|---|---|---|
| 2012/0238836 A1 | 9/2012 | Hyde et al. | | |
| 2013/0285807 A1* | 10/2013 | Tounooka | G16B 99/00 | 340/539.12 |

(Continued)

FOREIGN PATENT DOCUMENTS

| | | |
|---|---|---|
| CN | 107024580 | 5/2015 |
| CN | 109498857. | 7/2020 |
| WO | 2018156667 | 8/2018 |

*Primary Examiner* — Brian J. Sines
(74) *Attorney, Agent, or Firm* — David O. Simmons; IVC Patent Agency

(57) ABSTRACT

Systems, devices, methods, and computer-readable media may use broad-range spectrophotometric analysis and/or other sensors to generate data from bodily fluids accessed via a fluid drain. These data may be utilized to analyze therapeutic efficacy, to enable early detection of complications, and to guide the clinical management of patients being treated with a fluid drain. Advantageously, these systems, devices, methods, and computer-readable media enable clinical patient care decisions to be performed in a manner that is data-driven or quantitative in nature as opposed to qualitative—e.g., via well-defined, algorithmic-based processes and/or reliable methods. As a result, these systems, devices, methods, and computer-readable media enable improved clinical outcomes, more efficiently optimized medical care, and cost savings.

15 Claims, 16 Drawing Sheets

(56) References Cited

U.S. PATENT DOCUMENTS

| | | | | |
|---|---|---|---|---|
| 2014/0303455 | A1* | 10/2014 | Shachar ................. | A61B 5/031 600/301 |
| 2015/0230742 | A1 | 8/2015 | Silver | |
| 2016/0084762 | A1 | 3/2016 | Goix et al. | |
| 2017/0157374 | A1 | 6/2017 | Hedstrom et al. | |
| 2019/0195893 | A1 | 6/2019 | Sorek et al. | |
| 2020/0110098 | A1 | 4/2020 | Reisner et al. | |
| 2020/0277676 | A1 | 9/2020 | Hicks et al. | |
| 2020/0306423 | A1 | 10/2020 | Tharan et al. | |

* cited by examiner

SYSTEMS, DEVICES, METHODS, AND COMPUTER-READABLE MEDIA FOR ANALYSIS OF BODILY FLUIDS AND METHODS FOR ITS USE IN CLINICAL DECISION-MAKING

CROSS-REFERENCE TO RELATED APPLICATIONS

This non-provisional patent application claims priority to United States Provisional Patent Application having Ser. No. 63/248,517 filed 26 Sep. 2021 entitled "NON-INVASIVE, MULTI SPECTROPHOTOMETRIC AND FLOW MEASURING DEVICE FOR ANALYSIS OF BODILY FLUIDS AND METHODS FOR ITS USE IN CLINICAL DECISION-MAKING," which has a common applicant herewith and is being incorporated herein in its entirety by reference.

FIELD OF THE DISCLOSURE

The disclosures made herein relate generally to medical patient monitoring equipment and, more particularly, to systems, devices, methods, and computer-readable media for performing monitoring and analysis of bodily fluids.

BACKGROUND

Medical catheters are used to drain bodily fluids for therapeutic and diagnostic purposes. These catheters remain implanted in the patient, usually but not always while hospitalized, and output of the catheter is examined and recorded by nurses, doctors, and other healthcare professionals. Examples of medical catheter uses include, but are not limited to, intravascular line for blood pressure waveform monitoring, urinary catheter, postoperative wound drain to suction fluid from a recent surgical wound, and cerebrospinal fluid drainage via, for example, external ventricular drain (EVD), lumbar drain (LD), or the like. A person of ordinary skill in the art understands that the terms "catheter" and "drain" are used interchangeably to refer to a tubular medical device for insertion into canals, vessels, passageways, or body cavities to permit withdrawal of fluids. Such terms catheter and drain may accordingly be interchangeably used herein and, for simplicity of disclosure, are sometimes referred to herein as a fluid drain. Such a fluid drain may be permanently or temporarily placed and may be monitored one or more of continuously, intermittently, and singularly. Thus, an indwelling fluid drain is an embodiment of a fluid drain in accordance with the disclosures made herein.

Ultimately, the properties and change in properties (both static and dynamic) of bodily fluids are important in medical care. These characteristics of fluids include, but are not limited to, color, temperature, pressure, composition, opacity, flow, and viscosity. Clinicians assess these fluid characteristics to make clinical decisions, sometimes informally or qualitatively. Indeed, the ability to collect and understand data for these characteristics with sufficient accuracy, frequency, and ease-of-use are significant bottlenecks in clinical practice. Notably, this information is needed and is useful in making clinical care decisions that could prevent complications and improve outcomes. Tracking these fluid characteristics (i.e., fluid properties serving as biomarkers) lends insight into the health of the patient, extent or severity of disease states, effectiveness of therapy, recovery, and the rise of potential complications or challenges in care delivery.

In common neurosurgical disorders such as traumatic brain injury (TBI), hemorrhagic hypertensive stroke with intraventricular hemorrhage (IVH), aneurysmal subarachnoid hemorrhage (SAH), infection due to ventriculitis, cerebral edema, and hydrocephalus, the need often arises for patients to undergo the implantation of a cerebrospinal fluid (CSF) drainage catheter. The CSF drain catheter is typically in the form of an External Ventricular Drain (EVD), although a Lumbar Drain (LD) may serve the same or a similar purpose. When referring to EVD herein, it should be understood for these purposes that LD and other types of cerebrospinal fluid drainage devices are generally included in that term.

An EVD serves at least three major clinical purposes, which are: (1) monitoring intracranial pressure via a continuous fluid column allowing clinicians to treat and avoid elevations in this pressure; (2) treating the underlying pathology by temporarily diverting cerebrospinal fluid out of the body until the drain is either no longer needed or it is replaced by a permanent device such as an indwelling shunt; (3) providing an easy to access method for sampling the cerebrospinal fluid in order to diagnose problems or monitor efficacy of treatments. An EVD includes a length of transparent or translucent tubing through which bodily fluid can flow, similar to other medical catheters in common use. It passively drains CSF from the cerebral ventricles of the brain, out through the skin, to a bedside drainage apparatus with graduated markings for quantifying output (e.g., a Becker chamber).

The choroid plexus of the brain continuously produces CSF at a rate of approximately 15-30 mL/hour. Diversion of CSF is necessary in cases where hemorrhage or debris temporarily blocks the normal mechanisms of fluid clearance in order to avoid excess buildup of fluid pressure (a condition known as hydrocephalus) which can lead to coma or death. In the majority of cases, compromised mechanisms of fluid clearance are restored after the hemorrhage or debris is cleared from the ventricular system of the brain, and the EVD can safely be removed thereafter. The typical patient requiring an EVD will have the device implanted for between 7 and 21 days. Therefore, with this large time window, there is considerable variance in treatment protocols and outcomes, which reflects a need for reproducible and precise methods for management. To the extent that having an indwelling drain requires hospitalization, and/or intensive care, longer than necessary durations of having a drain are associated with major and unnecessary costs to the health care system. In the example of the EVD, as the drained fluid becomes clearer and less blood-tinged, clinicians may decide to wean or discontinue the drain. At present time, the decision to wean or discontinue the drain is often made qualitatively or arbitrarily and is based on a local clinician's judgment without use of a well-accepted algorithm or quantitative measurement.

After an EVD is placed, the standard of care is to admit a patient to an intensive care unit (ICU). The EVD typically drains cerebrospinal fluid through transparent tubing (usually composed of silicon or polyurethane, doped with MRI/CT identifiable elements such as barium) into a gravitational drainage chamber, which has demarcations allowing healthcare professionals to chart the output of the drain on an hourly or daily basis. The rate of passive drainage is controlled by adjusting the height of the drain relative to the patient and to the earth's surface. The pressure of the fluid is measured by manometry, or by using an electronic pressure transducer connected to a bedside patient monitor. The pressure transducer is often a supplemental in-line device, separated by a stopcock valve, which may attach to the EVD tubing through a universal Luer-lock mechanism.

The incidence of the aforementioned disorders requiring EVD and subsequent intensive care unit (ICU) admission is rising in the United States and globally, particularly due to hemorrhagic stroke and TBI. There are enormous costs to society, both human and financial, associated with these disease states. The health care system bears significant expense associated with each day a patient spends in the ICU with an indwelling EVD. Bedside nurses are typically charged with the continuous monitoring and hour-to-hour management of the EVD device. Healthcare professionals, such as neurosurgeons, neurologists, and critical care specialists, play an active role in decision-making concerning the EVD. On a daily basis, they integrate their clinical observations and may choose to raise, lower, remove, or replace the drain thereby decreasing or increasing the rate of drainage.

The EVD is typically weaned by gradually raising the drain over several days, until the patient has demonstrated stability at low or zero rates of drainage, therefore confirming that the drain can be removed. In the current state of the art, the process of EVD management is informed by the variables of time since implantation, intracranial pressure (ICP) values, ICP waveform, volume of fluid drainage, and visual appearance of the fluid. The latter is particularly important in patients where there is subarachnoid or intraventricular hemorrhage because the fluid begins with a very red-tinged (hemorrhagic) appearance and becomes increasingly clear as the drainage contains less hemoglobin. The fluid becomes yellowish, or straw-colored, with the presence of hemoglobin breakdown products such as bilirubin. This is known historically as the medical term "xanthochromia." It is thought that dependence on the drain is greatest when the high concentration of blood products results in blockage of the normal mechanisms for fluid clearance in the central nervous system. Therefore, as fluid color spectrum changes clinicians may adapt their management of the drain accordingly. At present time, this is done qualitatively and is based on individual clinicians' judgment, without the use of a device, a well-accepted algorithm, or reliable quantitative threshold.

In addition to the cost of excess hospital days, if the EVD is kept in for an overly long period of time, there is an increased risk of infection—as with all indwelling catheters. A cerebrospinal fluid catheter infection can be deadly or neurologically devastating. Notably, infection of the CSF, known as ventriculitis, is known to be correlated with turbidity of the fluid on visual appearance. As such, it stands to reason that quantitative measurement of the optical characteristics of the fluid may perform this infection-detecting function as well as or better than a clinician with a naked eye, who has an imperfect memory of how the fluid appeared on her previous rounds. Thus, spectrophotometric measurement has the potential to provide early prediction or diagnosis of clinically significant infection, enabling early intervention before the patient suffers irreversible brain damage. Other adverse consequences of keeping the EVD installed for more days than is necessary include increased hospital costs, delay in transferring out of the ICU, delay in accessing rehabilitation, delay in mobilization due to bed-rest, and worsened outcomes due to hospital-acquired complications such as deep vein thrombosis and systemic infections. Conversely, if the EVD is removed or weaned too quickly, the patient can suffer the onset of hydrocephalus and/or require the re-implantation of EVD. Moreover, this failure of weaning could result in unnecessary placement of a permanent ventricular shunt, which carries its own significant costs and risks. A prolonged ICU course would delay the patient's discharge from the hospital and downstream care. Thus, a goal of clinicians is to holistically consider all available data in managing the EVD. Typically they seek to minimize the duration of time of having an implanted CSF catheter, while also avoiding premature drain weaning or removal, or unnecessary conversion to permanent ventricular shunt.

In addition to qualitative (visual) inspection, another method clinicians use to monitor the CSF in ICU patients with indwelling EVDs is by sampling and testing the CSF in the laboratory. This method can yield measurements of, for instance, cell count, protein, glucose, and microbiological analysis. This sampling and test method can track clearance of hemorrhage and detect the presence of infection. However, it is associated with greatly increased cost and time lag and can only be reasonably performed intermittently (e.g., every few days) rather than continuously. Moreover, opening the EVD system to collect the fluid is itself known to be associated with increasing the risk of an infection. A lumbar puncture is a method of collecting CSF for sampling that does not entail opening the drainage catheter, but a lumbar puncture is an invasive procedure that is often disfavored due to the increased difficulty, risk, and discomfort for the patient.

In addition to the timing of drain weaning or removal and the detection of infection, another problem encountered with EVDs is the possibility of a tubing disconnection or occlusion. Disconnection can result from an agitated patient or from an inadvertent tubing disconnection while transferring or repositioning a patient. An undetected disconnection can result in over-drainage of CSF and/or contamination of the sterile system, leading to high risk of complications, including death. An occlusion can result in impaired drainage and life-threatening buildup of intracranial pressure. At present time, the ICU relies on bedside nurses to discover tubing disconnection or occlusions on their rounds, which may result in delayed or missed recognition of adverse events.

While the above paragraphs focus on the example of CSF catheters, e.g., EVDs, a similar analysis of needs and solutions would apply to other medical catheters used to drain other types of bodily fluids. Relevant examples in the medical field include, but are not limited to, catheters for urine (e.g., Foley catheters), blood, postoperative wound fluid, gastric fluid, pericardial fluid, pleural fluid, stool, bile, seroma, or infectious abscess. These catheters may be permanently indwelling, as with an EVD or a postoperative wound drain, or intermittently invasive, such as a temporary in-and-out urinary catheter or venipuncture collection tubing. For instance, assessing the spectrophotometric and flow properties of fluid running through a postoperative wound drain would allow clinicians to remove the drain or change its suction parameters once the drainage becomes less bloody and clearer, or dropped off in flow rate, or changed in turbidity. These various bodily fluids running through drainage catheters may be analyzed in a similar manner as CSF, to infer cellular composition, rate of output, viscosity, presence of inflammation/infection, and other applicable biomarkers. This underlying functionality enables enhanced evidence-based decision making and improved patient outcomes across many medical indications.

Therefore, systems, devices, methods, and computer-readable media that are configured to overcome drawbacks associated with conventional approaches for implementing fluid drain management and analysis of bodily fluids (particularly cerebrospinal fluids) conveyed via a fluid drain (e.g., tubing or a tubular conduit thereof) would be advantageous, desirable, and useful. Moreover, such systems, devices, methods, and computer-readable media would be usefully applied to embodiments and applications related to the measurement of properties of any of the aforementioned bodily fluids where, for brevity, CSF is highlighted herein as a relevant example.

SUMMARY OF THE DISCLOSURE

Embodiments of the disclosures made herein may be directed to systems, devices, methods, and computer-readable media that use sensors to monitor and analyze bodily fluids. In some embodiments, such systems, devices, methods, and computer-readable media may use broad-range (e.g., ultraviolet (UV), visible spectrum (VIS), and infrared (IR)) spectrophotometric analysis and flow-related sensors to measure (non-invasively or minimally invasively) data from bodily fluid drainage (e.g., cerebrospinal fluid (CSF) drainage). These embodiments may also be directed to systems, devices, methods, and computer-readable media by which such data may be utilized to monitor therapeutic efficacy, to enable early detection of complications, and to guide the management of patients having a fluid drain. Advantageously, systems, devices, methods, and computer-readable media in accordance with the disclosures made herein enables data analysis and associated patient care to be performed in a manner that is quantitative in nature as opposed to qualitative—e.g., well-defined, algorithmic-based processes and/or reliable quantitative thresholds.

The underlying objective of systems, devices, methods, and computer-readable media in accordance with the disclosures made herein is to improve the patient outcomes by enabling medical providers to perform quantitative data-based management of patients. Through such quantitative data-based management of patients, quality of care is enhanced through earlier detection of problems, improving efficacy of care management at lower costs and with fewer complications. This enhanced care is achieved by the real-time, evaluation of biomarkers (e.g., optical and otherwise, including but not limited to flow, pressure, temperature, etc.) that reside within or outside the body. In some preferred embodiments, real-time evaluation of a patient performed utilizing systems, devices, methods, and computer-readable media in accordance with the disclosures made herein is performed as a point-of-care evaluation (e.g., bedside). In some other embodiments, real-time evaluation of a patient performed utilizing systems, devices, methods, and computer-readable media in accordance with the disclosures made herein is not performed in a point-of-care manner but is rather performed at a central lab, test station, or other type of environment not considered to be a point-of-care environment. Devices in accordance with embodiments of the disclosures made herein are not solely for short term event determination. They can also be used to demonstrate long term, consistent evolution of patient biomarkers, tracking the improvement or deterioration of a clinical condition, or ultimately recommending the optimal time for weaning of the patient from medical interventions.

Embodiments of the disclosures made herein encompass both non-invasive and minimally-invasive implementations of systems, devices, methods, and computer-readable media. Non-invasive implementations relate to types of fluid drains where such biomarkers can be measured without contacting the bodily fluid of interest. Minimally-invasive implementations relate to devices where at least one of the sensor(s) of the device itself has one or more points of direct interface with the fluid itself.

Ultimately, and advantageously, a device configured in accordance with embodiments of the disclosures made herein will be as unobtrusive as possible during setup and use. For example, a nurse, clinician, or other healthcare professional will be able to deploy the device (e.g., by engaging with a fluid drain) and then cause (e.g., instruct) the device to start its monitoring functionalities. The device will then preferably operate autonomously to collect meaningful patient biomarker data such as, for example, fluid composition (e.g., constituent component(s)), pressure data, temperature data, and optical data until the device identifies fluid conditions that may warrant external help. Upon identifying such a condition, the device will issue a notification that responsive action needs to be taken. In some embodiments, the device may take the necessary responsive action by itself (e.g., automatic weaning of fluid). The construction of the device will preferably allow a healthcare professional to readily access the device to efficiently offload data that has been collected, and to understand any indicators (e.g., biomarkers) flagged for action. Thus, the device enables the healthcare professional to make informed clinical decisions (i.e., optimal weaning or drain removal time in the case of EVDs) that can provide beneficial patient and facility outcomes.

Devices configured in accordance with embodiments of the disclosures made herein may be compact and integrated to permit attachment to a fluid drain. They may include two or more sensing components each capable of sensing a respective parameter (e.g., biomarker-based fluid condition, fluid constituent component concentration, light absorbance/transmittance, fluid flow, fluid pressure, fluid turbidity). In preferred embodiments, a biomarker-based fluid condition may be used for identifying fluid components (such as hemoglobin) and an ultrasonic sensing interface may be used for monitoring fluid flow rates. Sensors of these devices may be non-invasive (e.g., capture data from an exterior surface of the EVD catheter), and data from these sensors are processed by a functionality control module (FCM). The data may be stored to memory (e.g., onboard the device) for future interrogation or transmitted to an external module.

In one or more embodiments, the fluid diagnostic device comprises at least one sensor, a tubular conduit holder and a functionality control module. The at least one sensor package is operable to generate output information as a function of parameters derived from fluid flowing through a fluid drain. The at least one sensor assesses the parameters derived from the fluid in a non-contact manner through one or more walls of the tubular conduit using at least one of optical and acoustic signals. The tubular conduit holder is operable to secure a portion of the tubular conduit in a fixed position and orientation relative to the at least one sensor. The functionality control module is operable to determine a responsive action as a function of at least a portion of the output information. Determination of the responsive action is initiated in response to at least a portion of the output information indicating an unacceptable deviation of a current condition of the fluid from a baseline condition of the fluid.

In one or more embodiments, a fluid diagnostic device comprises a spectrophotometry sensor, a tubing holder, and a functionality control module. The spectrophotometry sensor is operable to generate output information as a function of one or more wavelengths of reference light that is emitted by one or more signal emitting portions of the spectrophotometry sensor and that passes through fluid within a length of tubing. The tubing holder is configured to secure the length of tubing in a fixed position and orientation relative to the spectrophotometry sensor. The tubular conduit holder includes a first tubular conduit constraining body and a second tubular conduit constraining body. The tubular conduit constraining bodies jointly define a tubular conduit receiving space. At least one of the tubular conduit constraining bodies is movable relative to the other for enabling at a width of the tubular conduit receiving space to be adjustable for accommodating tubular conduits having different outside dimensions. The functionality control module is operable to determine a responsive action as a function of at least a portion of the output information. Determination of the responsive action is initiated in response to at least a portion of the output information indicating deviation of a current condition of the fluid from a baseline condition of the fluid and wherein the current and baseline conditions of the fluid relate to presence of a biomarker within the fluid. At least one of the signal emitting portions of the spectrophotometry sensor and the functionality control module is operable to correlate the at least one wavelength of the light to the parameter characterizing the presence of the biomarker within the fluid.

In one or more embodiments, a device configured to provide care to a patient being treated through use of a fluid drain comprises a spectrophotometry sensor and a functionality control module. The spectrophotometry sensor is operable to generate output information as a function of one or more wavelengths of reference light emitted by one or more signal emitting portions of the spectrophotometry sensor and that passes through the bodily fluid. The functionality control module has a non-transitory computer-readable medium carrying one or more sequences of instructions configured for implementation of diagnostic functionalities in association with the fluid passing through the tubing of a drain tubing. The functionality control module is coupled to the spectrophotometry sensor to enable the following functionalities the transmission of signals from the spectrophotometry sensor for reception by the functionality control module. Execution of the one or more sequences of instructions accessed from a non-transitory computer-readable medium of the functionality control module by one or more processors of the functionality control module causes the one or more processors to: receive sensor information generated by the spectrophotometry sensor, analyze the output information to determine when a fluid condition characterized by a biomarker within the fluid being within or outside a prescribed range is present, and cause, in response to the condition being present, transmission of a signal from the fluid diagnostic device for reception by an individual user or by a remote system operable to carry out the responsive action, wherein the signal has a first portion thereof indicative of the responsive action.

In one or more embodiments, a method for providing care to a patient being treated using a fluid drain for draining a fluid. The method is performed by a functionality control module of a fluid diagnostic device engaged with a drain tube of the fluid drain. The method comprises the steps of receiving sensor information, performing analysis of the output information, and causing transmission of a signal. The sensor information is generated by a spectrophotometry sensor of the device that is operable to generate output information as a function of one or more wavelengths of reference light that is emitted by one or more signal emitting portions of the spectrophotometry sensor and that passes through the fluid, wherein the output information characterizes a biomarker present within the fluid. The analysis is performed to determine when a fluid condition, characterized by a biomarker within the fluid being within or outside a prescribed range (e.g., above or below a prescribed threshold), is present. In response to the condition being present, the signal is caused to be transmitted from the fluid diagnostic device for reception by a remote system operable to carry out the responsive action. The signal has a first portion thereof indicative of the responsive action. The functionality control module has a non-transitory computer-readable medium carrying one or more sequences of instructions configured for enabling the steps to be performed.

These and other objects, embodiments, advantages and/or distinctions of the present invention will become readily apparent upon further review of the following specification, associated drawings, and appended claims.

BRIEF DESCRIPTION OF THE DRAWINGS

The following drawings & descriptions illustrate (show) by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. Views in the figures are drawn to scale, unless otherwise noted, meaning the sizes of the depicted elements are accurate relative to each other for at least the embodiment in view.

A device or system that is configured in a certain way is configured in at least that way, but it can also be configured in ways other than those specifically described. The feature or features of one embodiment may be applied to other embodiments, even though not described or shown, unless expressly prohibited by this disclosure or the nature of the embodiments. Some details associated with the embodiments described above and others are described below.

DETAILED DESCRIPTION

Figure 1:
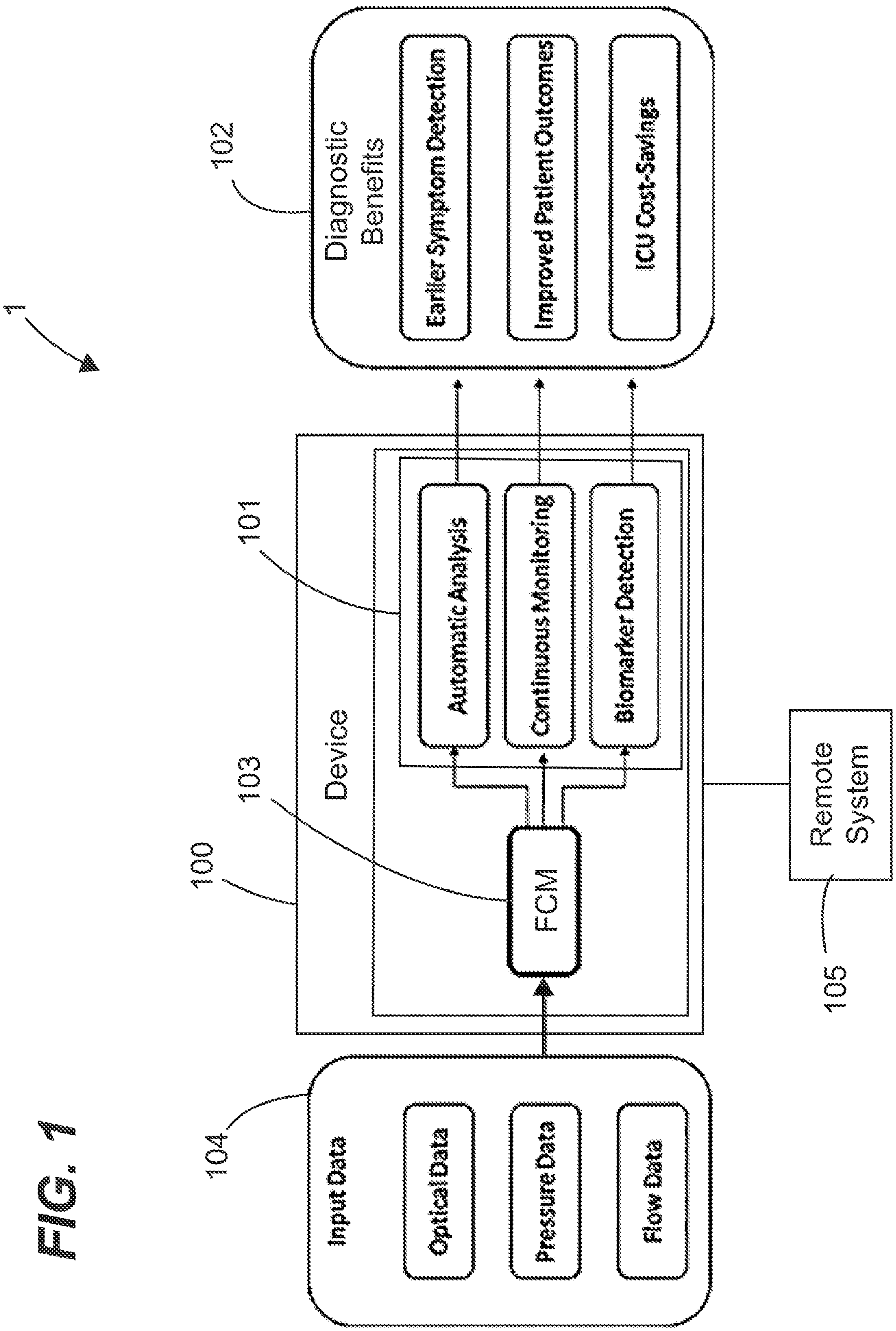
FIG. 1 is a diagrammatic view showing a fluid assessment framework configured in accordance with one or more embodiments of the disclosure made herein.

As a disclaimer, the disclosures made herein may reference cerebrospinal fluid monitoring examples and descriptions related to the same because such an example is a motivating use case for systems, devices, methods, and computer-readable media in accordance with such disclosures. However, it should be stressed that the embodiments of the disclosures made herein may be applied to various types of bodily fluid (i.e., most relevant here are typically in liquid form) for useful clinical purposes, such as, for example, blood, urine, wound drainage, and the like. Accordingly, the breadth of the disclosures made herein are not limited to a scope of such exemplary disclosures.

As discussed herein, there is a need in the art for systems, devices, methods, and computer-readable media that can provide for non-invasive analysis of bodily fluid (e.g., CSF), thereby enabling enhanced evidence-based decision-making and associated improvements in patient outcomes. Embodiments of the disclosures made herein address this need through facilitating the ability of clinicians to monitor and manage the care of patients with having a fluid drain utilizing such systems, devices, methods, and computer-readable media. These systems, devices, methods, and computer-readable media implement the use of non-invasive data collection to eliminate prior invasive techniques utilized to test bodily fluid for tracking the presence of blood or infection. Advantageously, embodiments of the disclosures made herein provide a quantitative, reproducible approach, eliminating the reliance on qualitative assessments of fluid color and flow variables, as well as reducing variability between clinical sites. Additionally, such embodiments may provide effectively continuous, rather than intermittent, monitoring of bodily fluid, thereby allowing quicker action in response to changes in a patient's condition. This includes the possibility of alarming staff to safety concerns such as early infection detected as fluid turbidity, as well as the rapid recognition of a tubing disconnection detected as a signal discontinuity resulting from an air bubble.

Embodiments of the disclosures made herein incorporate an algorithm for using spectrophotometry and, optionally, hydrodynamic data to guide clinical decisions. For example, guiding such clinical decisions may include when to begin weaning CSF drainage, when to remove a fluid drain, when to initiate aggressive workup for a possible infection detected earlier than by existing means and the like. The digital format of the collected data allows software-enabled implementations of systems, devices, methods, and computer-readable media in accordance with the disclosures made herein to utilize learning from multiple sites to guide improved patient management algorithms and guidelines. This underlying functionality enables enhanced evidence-based decision making and improved patient outcomes across many indications where the critical challenges in doing so would involve calibration, clinical workflow integration, and biomarker quantification.

Biomarker detection is an important capability of systems, devices, methods, and computer-readable media in accordance with preferred embodiments of the disclosures made herein. A preferred and well-known method for detecting and characterizing particular biomarkers is spectrophotometry, which uses one or more spectrophotometers to measure the intensity of a light beam at different wavelengths. Advantageously in regard to these disclosures is that spectrophotometry provides for measurement of how much a chemical substance absorbs light by measuring the intensity of light as a beam of light passes through a light transmissive test sample that comprises the chemical substance. The basic principle is that each compound absorbs or transmits light over a certain range of wavelengths. This measurement can also be used to measure the amount of a known chemical substance.

Spectrophotometers include a light emitter (i.e., a light source) and a light receptor (e.g., a spectrometer). The light emitter may be a light source that emits a substantially uniform supply of light (e.g., a LED), typically over a prescribed range of wavelengths. The light receptor captures light within the spectral (i.e., wavelength) range and outputs a corresponding signal character measurement of the light intensity on a per-wavelength basis. In this regard and as relevant to the disclosures made herein, a spectrophotometer is able to provide measurement of how much of an emitted light a chemical substance within a light transmissive test sample absorbs. This measurement involves passing a beam of light of known characteristics through the light transmissive test sample comprising the chemical substance and measuring the resultant light (light having passed through the light transmissive test sample comprising the chemical substance) to determine its characteristics (e.g., light intensity on a per-wavelength basis). In preferred embodiments of the disclosures name herein, the wavelength range of primary interest is about 350 nm to about 1200 nm.

Referring to FIG. 1, a fluid assessment framework 1 is configured in accordance with one or more embodiments of the disclosure made herein to aid in significantly reducing, if not eliminating, manual, in-accurate, laborious approach to assess bodily fluids such as to identify useful biomarkers. In preferred embodiments, the fluid is a liquid such as, for example, cerebrospinal fluid (CSF). The fluid assessment framework 1 provides diagnostic benefits 102 such as, for example, earlier symptom detection, improved patient outcomes, and facility/department (e.g., ICU) cost savings.

At the heart of the fluid assessment framework 1 is a fluid diagnostic device 100 configured in accordance with embodiments of the disclosures made herein. The fluid diagnostic device 100 provides autonomous, continuous, real-time assessment of bodily fluid through either a non-invasive manner or a minimally invasive manner where provided functionalities so require. This assessment involves diagnostic functionalities 101 such as, for example, automated (e.g., automatic) analysis of bodily fluid, continuous monitoring of the bodily fluid, and detection of biomarkers within the bodily fluid. These diagnostic functionalities provide the foundation for the aforementioned benefits of the fluid assessment framework 1. Through such noninvasive or minimally invasive manner of assessing the bodily fluid, the fluid diagnostic device 100 generates (or, alternatively, may receive from a remote source) fluid characterizing information 104 and utilizes such information for assessment of the diagnostic functionalities 101. Examples of the fluid characterizing information (i.e., input data) 104 include, but are not limited to, optical data (e.g., spectral frequency data), pressure data, temperature data, clarity (e.g., turbidity) data, fluid constituent component data (e.g., data characterizing one or more constituent components of a fluid), and flow data. In these manner, the fluid diagnostic device 100 can quantitatively track biomarkers (e.g., light absorption spectra) and other clinical care defining data to either take a clinical care management action itself or notify the healthcare provider to take an action, ultimately improving patient outcomes and identifying complications in an early onset manner. Output information generated by the device 100 may be provided to a remote system 105 (e.g., a computer, dedicated/proprietary medical system, or the like).

Figure 2:
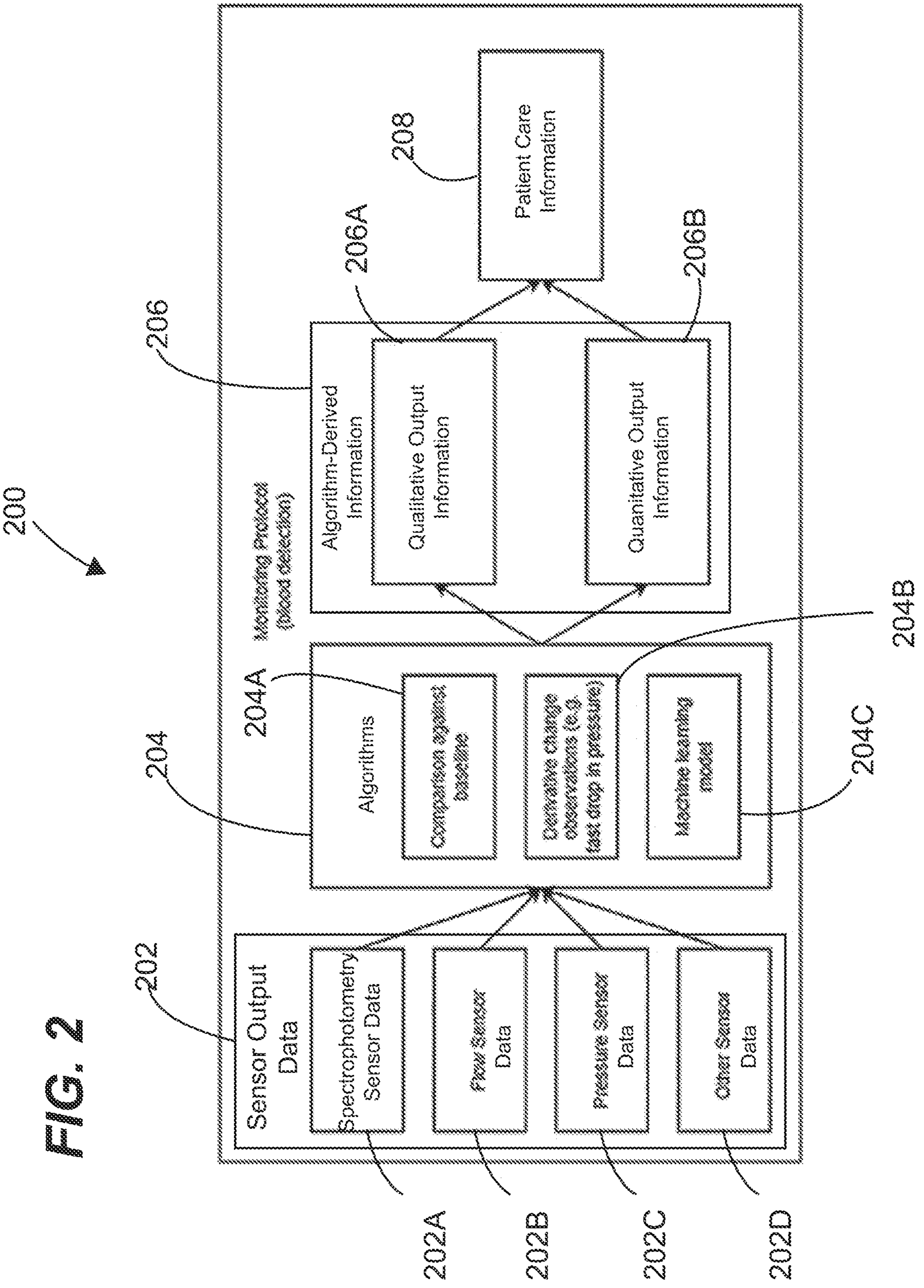
FIG. 2 is a diagrammatic view showing a monitoring protocol for devices in accordance with embodiments of the disclosures made herein, which at least partially defines their operability.

Devices in accordance with embodiments of the disclosures made herein carry out a monitoring protocol that at least partially defines their operability. For example, in preferred embodiments, their operability will provide for at least the functionality discussed above in reference to the fluid assessment framework 1 and fluid diagnostic device 100 thereof. An embodiment of such a monitoring protocol (i.e., monitoring protocol 200) is depicted in FIG. 2, where the monitoring protocol may be particularly configured for use with fluids that may include blood. The fluid diagnostic device 100 may be integrated into an existing system comprising a fluid drain or may be a standalone device. It may be either standalone or integrated as a component into larger manufactured medical products. An example of this would be integrating the device into a draining chamber and pressure monitoring setup typically used for a bedside external ventricular drain (EVD), such as the system sometimes historically known as a Becker drain.

The monitoring protocol 200 includes one or more sensor output data 202 generated by one or more associated sensors. Examples of the one or more sensor output data 202 may include a sensor output providing spectrophotometry data 202A (i.e., via a spectrophotometry sensor), a sensor output providing flow data 202B (i.e., via a flow sensor), a sensor output providing pressure data 202C (i.e., via a pressure sensor) and one or more other sensor outputs providing respective forms and/or types of sensor data 202D. The sensor output data 202 may be in one or more forms or types of respective data (i.e., collectively referred to herein as available sensor data). Selection of a specific sensor outputs or collection of sensor outputs may be made in accordance with the particular type of diagnostic monitor being performed and/or the particular type of fluid (and constituent components/inclusions thereof) being analyzed. In preferred embodiments, the sensor output data 202 is provided by one or more onboard sensors of a device configured within embodiments of the disclosures made herein (e.g., the fluid diagnostic device 100). Monitoring protocols and devices in accordance with embodiments of the disclosures made herein are not necessarily limited to including any particular sensor output(s) or combinations thereof.

The monitoring protocol 200 includes one or more algorithms 204 (e.g., one or more sequence of instructions providing a desired functionality). Each of the one or more algorithms 204 receives all or a portion of the sensor output data 202. Using this sensor output data, each of the one or more algorithms 204 via a device within which the one or more sensors may be integrated (e.g., the fluid diagnostic device 100 discussed above) contribute to performing analysis of such data to determine a patient's health and environmental context. Examples of the one or more algorithms 204 may include an algorithm that provides for filtering of all or a portion of the sensor data, an algorithm that provides for matching of patterns of information within the sensor data, an algorithm that provides for Fourier transformations of sensor data for enabling frequency detection, and an algorithm that provides for artificial intelligence (e.g., edge AI) and machine learning functionalities. Algorithms useful with monitoring protocols and devices in accordance with embodiments of the disclosures made herein are not necessarily limited to providing for any particular functionalities but will rather be inspired by relevant guidelines of clinical care and depend on required/desired bodily fluid and action/response indication considerations.

The one or more algorithms 204 utilize the sensor data 202 (i.e., sensor output data) to derive associated information (i.e., algorithm-derived information 206.) One example of the algorithm-derived information 206 includes qualitative output information 206A such as recommendation of an actionable (e.g., binary) notification that may result in responsive (e.g., corrective) action by the device (e.g., autonomously flush the line) or the clinician (e.g., by notifying them remotely via a remote system). Another example of the algorithm-derived information 206 includes quantitative output information 206B such as information that may be displayed to the clinician in the form of a score, as a final user-facing output of the system, or may describe context and justification behind an actionable notification (e.g., information used in determining a responsive action). Such quantitative output information 206B may beneficially help a healthcare professional with determining a preferred course of action in regard to responding to an actionable notification. Thereafter, the monitoring protocol 200 utilizes all or a portion of the algorithm-derived information 206 as patient care information 208. The patient care information 208 may be communicated (e.g., electronically transmitted as a signal, audibly transmitted or the like) for reception by one or more recipients which may be a person, device, apparatus, system or otherwise The patient care information 208 may be in the form of one or more responsive actions and/or associated information (i.e., quantitative information and/or qualitative information). Examples of responsive actions include, but are not limited to, sending an instruction, update, or alert in regard to a corrective action being performed, issuing a command or instruction (e.g., via a digital or analog signal) to cause an automated task to be performed, and the like.

Presented now is a specific example of implementation of the disclosed monitoring protocol 200. In the case of an external ventricular drain (EVD), a pressure sensor of a device (e.g., the fluid diagnostic device 100) detects a change (e.g., drastic, notable, undesirable, etc.) in pressure in a fluid drain within a timespan of a few seconds. The device infers that the patient has changed positions and the EVD needs to be re-leveled. Because the device may be interfaced with a smart EVD (i.e., able to actively respond to such changes), the EVD may perform its own corrective action to raise or lower the EVD drain line. Otherwise, the device sends a notification indicating that the EVD needs attention (e.g., inspect and manually adjust).

As one skilled in the art knows, complications with EVDs include, but are not limited to, ventriculitis, hemorrhage/rebleeding, misplacement, occlusion, and mechanical failure. It is disclosed herein that these complications may be readily prevented or resolved through biomarker detection and management provided by a fluid diagnostic device configured in accordance with one or more embodiments of the disclosures made herein. Clinical uses for EVDs and thus devices in accordance with embodiments of the disclosures made herein include, but are not limited to, fluid management arising in association with traumatic brain injury, hydrocephalus, subarachnoid hemorrhage (i.e., ruptured aneurysm), and hemorrhagic stroke.

Figure 3A:
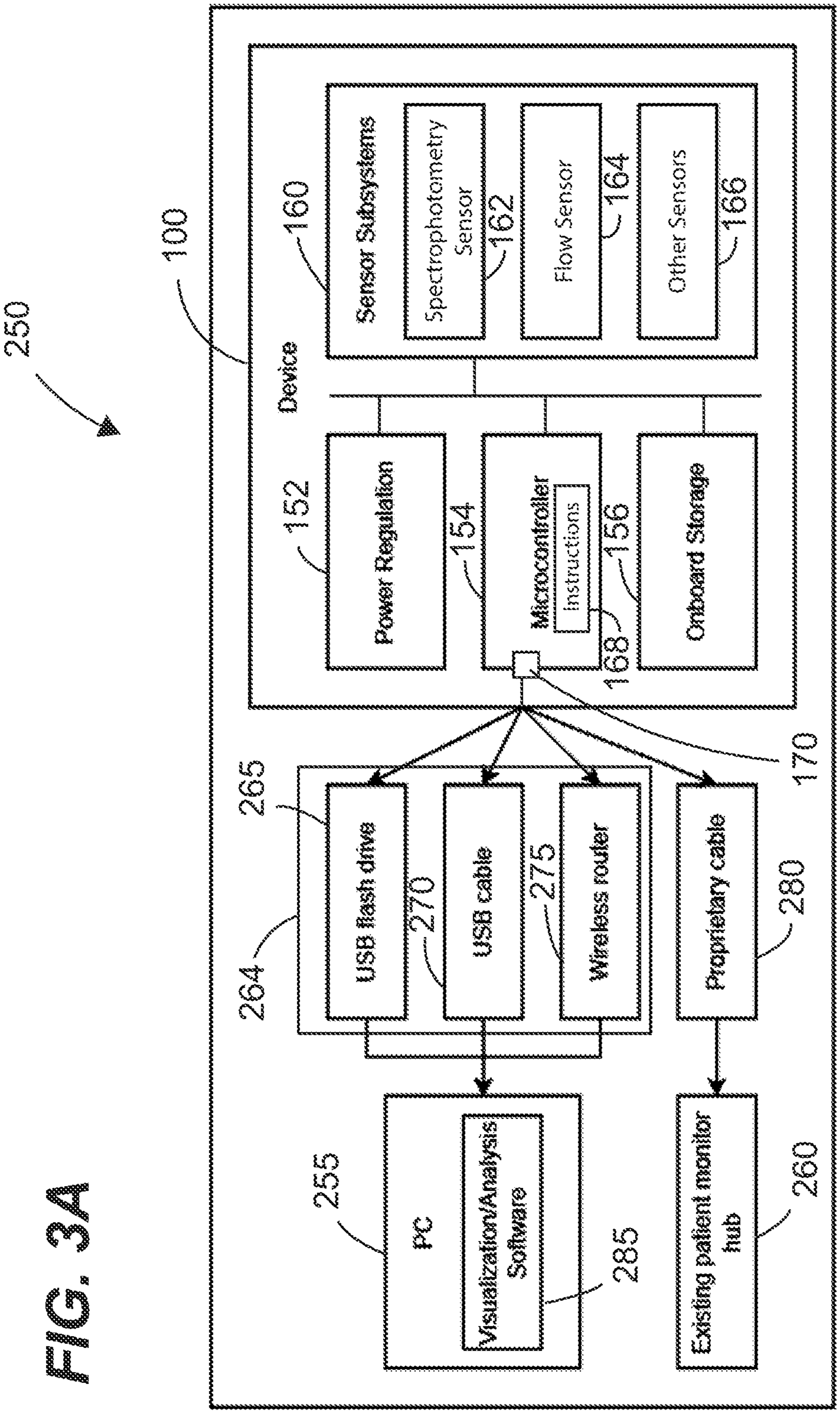
FIG. 3A is a diagrammatic view showing functional aspects of a diagnostic system in accordance with embodiments of the disclosures made herein.

FIG. 3A shows functional aspects of a diagnostic system 250 in accordance with embodiments of the disclosures made herein. The diagnostic system 250 includes a fluid diagnostic device 100 configured in accordance with embodiments of the disclosures made herein (i.e., the fluid diagnostic device 100 discussed above in reference to FIGS. 1 and 2), a computer 255, a patient monitoring hub 260 (e.g., a computer), a solid state drive 265, a serial bus cable 270, a wireless communication interface 275 (e.g., wireless router, Bluetooth radio transceiver, Wi-Fi, and the like) and a dedicated communication interface 280. The solid state drive 265, the serial bus interface 270 and the wireless communication interface 275 are information sharing components 264 that each enable delivery (e.g., communication) of information (e.g., data) from the fluid diagnostic device 100 to the computer 260. The fluid diagnostic device 100 includes corresponding information sharing components for enabling interconnection with the information sharing components 264 and the dedicated data interface 280. The dedicated data interface 280 (e.g., a proprietary cable) is an interface component that enables transmission of information (e.g., data) from the fluid diagnostic device 100 to the patient monitoring hub 260 (or other proprietary equipment) for allowing processing of such information by the software 285 being executed via processor(s) and memory of the patient monitoring hub 260.

The computer 255 of the diagnostic system 250 is adapted for processing information generated by the fluid diagnostic device 100, where such information may be accessed by and/or provided to the computer 255 via one or more of the information sharing components 264. To this end, the computer 255 preferably includes software 285 that is executed from memory (preferably non-transitory) of the computer 255 by one or more processors of the computer 255. In preferred embodiments, the software 285 may enable visualization and/or analysis of the information accessed by and/or provided to the computer 255 from the fluid diagnostic device 100.

The fluid diagnostic device 100 includes a plurality of interconnected and interoperable components enabling diagnostic functionality as discussed above in reference to FIGS. 1 and 2. In preferred embodiments, these interconnected and interoperable components include a power control component 152, a microcontroller 154 (i.e., processor), on-board storage 156, and a sensor subsystem 160. The microcontroller 154 is connected to the information sharing components 264 for allowing sensor data to be communicated from the fluid diagnostic device 100 to one or more computers (e.g., a PC, computer network, dedicated computer (the patient monitoring hub 260) or the like) for enabling access to the information (e.g., data) for functional purposes (e.g., visualization, analysis, monitoring, and the like). The power control component 152 provides functionalities including power supply and regulation.

The sensor subsystem 160 includes sensors each configured for outputting a respective type of data (i.e., information). In preferred embodiments, sensors of the sensor subsystem 160 include, but are not limited to, a spectrophotometry sensor 162, a fluid flow sensor 164, and one or more other sensors 166 (e.g., a fluid pressure sensor, turbidity sensor, etc.). The specific sensors of the fluid diagnostic device 100 are selected based on the underlying functionalities intended to be provided by the fluid diagnostic device 100. A sensor as disclosed herein may be in the form of a package (sensor package) that includes a structural component (e.g., for mounting or the like) and/or related components (e.g., signal processing, generating, calibrating, etc.) for outputting (e.g., transmitting) a required form and/or type of data output. Accordingly, a sensor package as disclosed herein may include ancillary components such as, for example, one or more mounting components, a circuit board to enable electrical interfacing, and the like. Thus, the sensor package may perform processing of an output signal from one or more resident sensors of the sensor package prior to enabling a processed output signal to be transmitted for reception not any system component (e.g., a functionality control module).

The microcontroller 154 provides for execution of one or more sequences of instructions 168 enabling the aforementioned diagnostic functionality to be carried out (e.g., steps and processes thereof). The microcontroller 154 preferably includes one or more processors, memory and input/output (I/O) peripherals (e.g., data communication bus(es)), which is generally on a single chip. On-board storage 156 serves to enable persistent storage of information (e.g., data) generated by the fluid diagnostic device 100 and/or received from the computer 255 or apparatus external to the diagnostic system 250 or otherwise integrated therewith. Microcontroller architecture and operation is well known and will not be discussed herein in further detail. Alternately, the fluid diagnostic device 100 may include discrete or semi-integrated components for enabling execution of instruction enabling the aforementioned (or other) diagnostic functionality to be carried out.

The one or more sequences of instructions 168 are configured (coded, programmed or the like) to enable diagnostic functionalities in accordance with embodiments of disclosures made herein (e.g., all or a portion of diagnostic functionalities 101) to be carried out via the fluid diagnostic device 100. Preferably, the one or more sequences of instructions 168 are accessed from memory of the microcontroller 154 and executed by the one or more processors of the microcontroller 154. The microprocessor 154 includes an input/output portion 170 through which data is communicated to and from the information sharing components 264 of the diagnostic system 250. In this regard, sensor data from the sensor subsystems 160 of the fluid diagnostic device 100 may be provided to external devices through which such sensor data may be analyzed, visualized, and otherwise utilized.

The one or more processors and memory of the microprocessor 154 and the one or more sequences of instructions 168 jointly define a functionality control module (FCM) (e.g., FCM 103 as shown in FIG. 1) of the device 100. It is disclosed herein that the FCM may be implemented in other configurations while still providing required/expected diagnostic functionalities. The instructions as embodied herein are an example of a non-transitory computer-readable medium carrying one or more sequences of instructions configured for implementation diagnostic functionality in accordance with embodiments of the disclosures made herein. In some embodiments, a sequence of instructions is disclosed herein as including or consisting of one or more algorithms. In preferred embodiments, functionality control modules are operable to determine when a biomarker is not detectable within the fluid and/or when an amount of a biomarker is within or outside a certain range. It is disclosed herein that the spectrophotometry sensor and/or the functionality control module may be operable to detect the biomarker within the fluid. It is also disclosed herein that the functionality control module may be coupled to the spectrophotometry sensor for enabling an output signal including information generated by the spectrophotometry sensor to be transmitted therefrom for reception by the functionality control module.

In general, sensors and sensor packages in accordance with embodiments of the disclosures made herein may be included to yield information relating to, for example, one or more of the following biomarkers (i.e., fluid characterizing parameters): color, temperature, pressure, fluid constituent components, reactivity, flow, flow disturbances, fluid output (cumulative or otherwise), viscosity, turbidity, bubbling (e.g., aeration), and the like. Specific examples of fluid constituent components include, but are not limited to, glucose, protein, electrolytes, hemoglobin, white blood cells, cellular debris, urea, xanthochromia, and bilirubin.

Fluid color and turbidity can be easily and accurately obtained from the fluid drain (e.g., an EVD catheter) without manual inspection using an optical spectrometer, opening up the possibility of remote detection of blood or elevated white blood cell count (WBC) in the line. Red or brown CSF may indicate the presence of fresh blood, which then becomes yellowish as the blood clears and hemoglobin breakdown products predominate. A turbid or cloudy CSF may indicate that a serious infection is brewing, and this may detect infection earlier than other screening methods such as looking for fevers. Thus, turbidity of the fluid can serve as a novel early indicator of ventriculitis infection, allowing early intervention. Bubbles can also be detected through this method and can demonstrate that air has been introduced through the system, which can signify a life-threatening disconnection, pull-out, or breakage in a fluid drain proximal to the sensor. Flow rate can be monitored to determine the status of the patient or fluid drain setup. If the flow rate has changed slightly over a long period of time, it may indicate a change in CSF production. If the flow rate changes drastically over a short period of time, it may indicate that the fluid drain is leaking, or if there is a discontinuity (e.g., a blood clot) in the fluid drain inlet that is limiting or preventing flow. It may also indicate that the patient elevation has changed relative to the fluid drain setup and requires adjustment. To this end, diagnostic devices in accordance with embodiments of the present disclosures may be placed between a patient and a collection chamber near the well-known "zero-line". This fashion of placement decreases the chance of compound pooling due to its orthogonal orientation to the floor. Additionally, this area of the fluid drain provides relative movement damping due to the localized structural support and tube slack, allowing the device to move less if the patient moves.

In preferred embodiments of the disclosures made herein, one or more sensors are utilized for enabling bodily fluid to be subject to spectrophotometry. For example, the spectrophotometry sensor 162 (FIG. 3) of the fluid diagnostic device 100 for enabling bodily fluid to be subject to spectrophotometry. In particular, the spectrophotometry sensor 162 is configured (including its physical manner of device integration) to identify light absorptivity across a range of wavelengths for fluid in a tubing of a fluid drain. The relative change in amplitude measured across these wavelengths may be evaluated against known spectra of various solutions and cultures to infer an amount and concentration of one or more biomarkers.

Figure 3B:
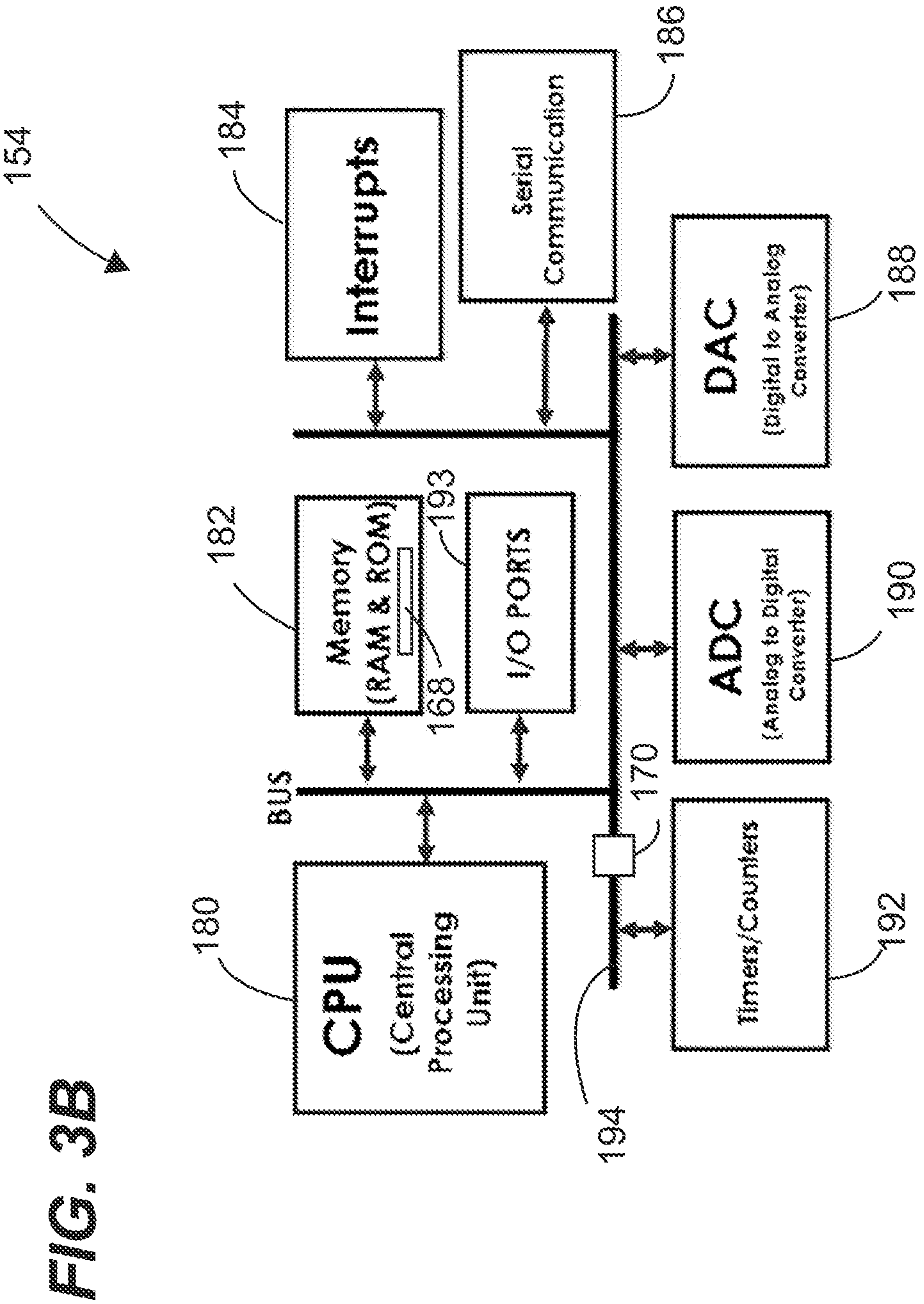
FIG. 3B is a block diagram of a microcontroller useful with functionality control modules in accordance with embodiments of the disclosures made herein.

FIG. 3B shows a general configuration of a microcontroller such as, for example, microcontroller 154. The microcontroller 154 includes a CPU (central processing unit) 180, memory 182, interrupt logic 184, serial communication port 186, DAC (digital to analog converter) 188, ADC (analog to digital converter) 190, timers (e.g., counters) 192, input/output (I/O) ports 193 and a bus 194. The CPU 180, memory 182, interrupt logic 184, serial communication port 186, DAC 188, ADC 190, timers 192 and I/O ports 193 are connected to each other through bus 194. The CPU 180 is the brain of the microcontroller 154. The CPU 180 includes an arithmetic logic unit (ALU) and a control unit (CU). The CPU reads, decodes, and executes instructions to perform arithmetic logic and data transfer operations respectively via the ALU and the CU. Memory 182 includes program memory and data memory. Program memory serves to store one or more programs comprising instructions to be executed by the CPU 180 (i.e., a processor). Data memory serves to store temporary data while executing the instructions. Typically, program memory is a Read Only Memory (ROM) and data memory is Random Access Memory (RAM).

Interfacing for the microcontroller 154 to the external world is provided by I/O ports 193. Input devices such as, for example, switches, sensors, user input devices (e.g., keypads), etc. provide information from the user to the CPU 180 in the form of, typically, binary data. The CPU 180, upon receiving data from the input devices, executes appropriate instructions and gives response through output devices like LEDs, displays, printers, etc. The bus 193 is a group of connecting wires or traces that connect the CPU 180 with other peripherals like memory 182, I/O ports 193 and other supporting components of the microcontroller 154. The timers 192 provide the operations of time delays and counting external events for sharing access to the bus 194. Additionally, the timers 192 can provide functionalities such as, for example, function generation, pulse width modulation, clock control, and the like.

The serial port 186 enables communication with other devices and peripherals that are external to the system to which the microprocessor 154 is directly integrated. The serial port 193 provides such interface through serial communication (e.g., universal asynchronous receiver-transmitter (UART)). Interrupts 184 provide an interrupt handling mechanism for allowing seamless execution of instruction elements by the CPU 180. The ADC 190 converts analog signals to digital signals. The ADC 190 forms the interface between the external analog input devices (e.g., analog-based sensors and sensor packages) and the CPU 180. Almost all sensors and sensor packages are analog-based devices and the analog data from these sensors must be converted into digital data for the CPU 180 to process them. The DAC 188 converts digital signals to analog signals. The DAC 188 forms the bridge between the CPU 180 and the external analog devices. Layout, fabrication, and functionality of microcontrollers are well known and will not be discussed herein in further detail.

In view of the disclosures made herein, a skilled person will appreciate that the microcontroller may be configured to process information in a variety of different ways. In one approach, the microcontroller of a fluid diagnostic device generates and outputs information that may include both an action item(s) and information characterizing information used in determining the action item. In another approach, the diagnostic device generates output information (e.g., information derived from sensor signals) that may be provided to a remote computing system (i.e., a remote system) which assesses that output information to generate processed output information that may include both action item(s) and information characterizing information used in determining the action item. In this regard, the sensor(s) may generate the output information or it may output raw or processed sensor signals and a processing module of the device (e.g., a diagnostic functionality module) generating the processed output information. Embodiments in accordance with the disclosures made herein are not limited to a particular manner in which information is processed or which components process the information.

It is important that environmental factors (e.g., setup considerations) associated with using a fluid diagnostic device in accordance with embodiments of the disclosures made herein (e.g., fluid diagnostic device 100) do not interfere with the accuracy of patient data. Advantageously, fluid diagnostic devices in accordance with embodiments of the disclosures made herein are preferably configured to enable correction of sensor data as a function of associated environmental factors. Sensor data (e.g., data from at least one of the one or more sensors) is discussed above in reference to FIG. 2. Examples of approaches for such correction of sensor data include, but are not limited to, determination/application of a correction factor determined as a function of associated environmental factors, determination/application of a calibration factor determined as a function of associated environmental factors and the like. In addition to detecting properties of liquid inside of tubing of a fluid drain (i.e., a fluid flow conduit), implementations of spectrophotometry as disclosed herein allow for the detection of physical properties of the fluid flow conduit itself.

Figure 4:
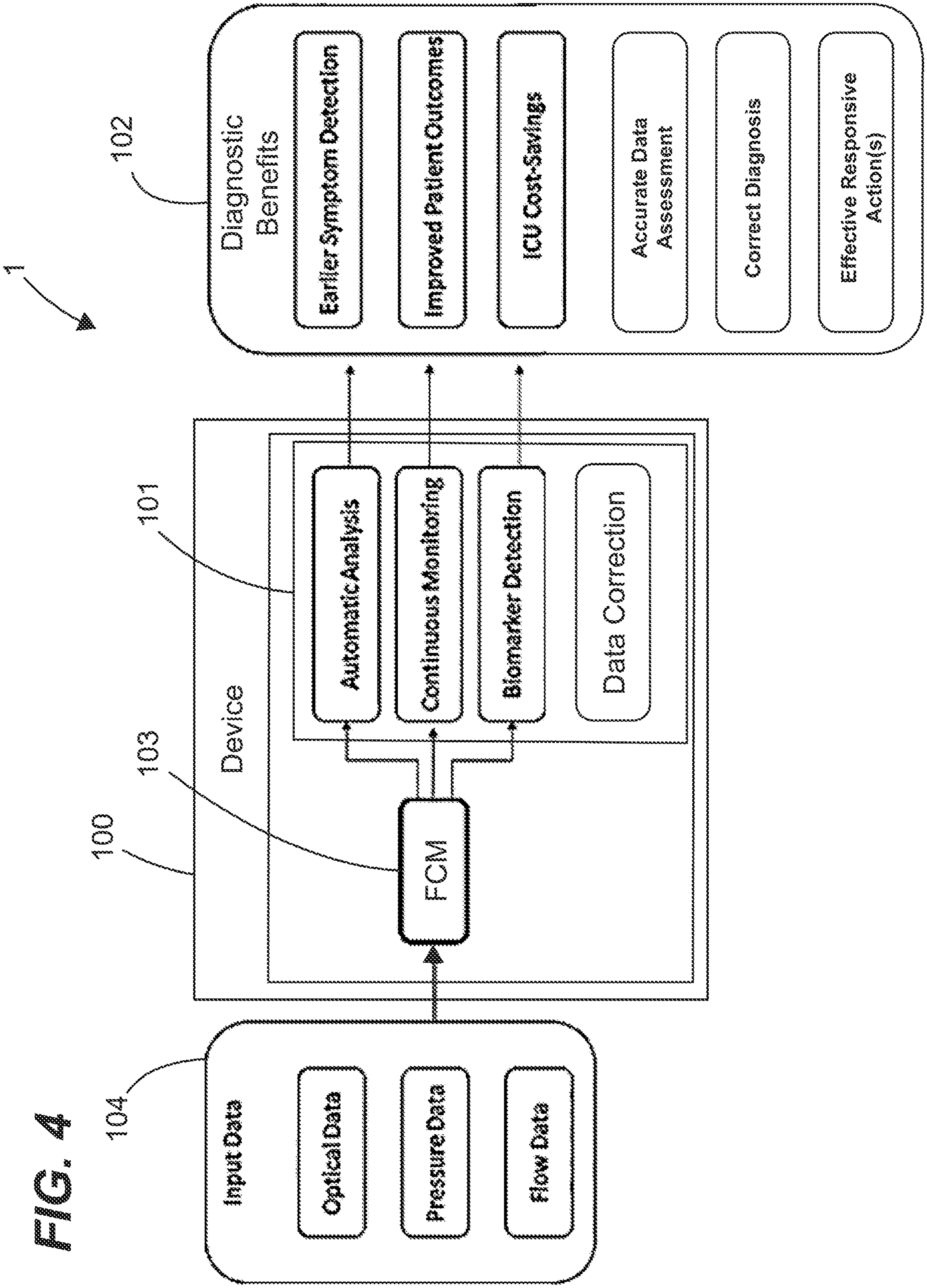
FIG. 4 is a diagrammatic view showing the fluid assessment framework discussed in reference to FIG. 1 with integration of functionality that provides continuous correction for real-time deviations of data from ideal testing conditions.

FIG. 4 shows the fluid assessment framework 1 discussed above in reference to FIG. 1 with integration of functionality that provides continuous correction for real-time deviations of data from ideal testing conditions. These integrated functionalities (i.e., the diagnostic functionalities 101) include a data correction (e.g., an algorithm providing such data correction) that provides for such continuous correction for real-time deviations from ideal use conditions. Data correction is preferably provided via a closed-loop, automatic process flow logic (e.g., within a data correction algorithm) that carries out real-time correction for environmental factors that has the potential to (and often does) influence accuracy of data influenced by such environmental factors. Inaccuracy in sensor data can adversely impact desirable and diagnostic benefits 102 such as, for example, accurate data assessment, correct diagnosis, and effective responsive (e.g., corrective) actions. Notable conditions that may be detected and corrected for through such a data correction algorithm include, but are not limited to, presence of tube, tubing defects, presence of liquid, presence of air bubbles, rotation of internal tubing elements (e.g., radiopaque strips, tubing opacity, etc.), and environmental lighting conditions that may adversely impact spectrophotometry or other sensor functions.

Positioning of medical tubing within fluid diagnostic devices configured in accordance with the disclosures made herein may affect sensor data. To this end, sensors (and sensor packages comprising same) may be implemented within an associated fluid diagnostic device in a manner that enables compensation or correction for such tubing positioning variables as-mounted on (i.e., attached to) the fluid diagnostic device. For example, a sensor or sensor package may be integrated into the fluid diagnostic device for enabling its movement (e.g., translational, rotational, pivotal) relative to a mounting structure that retains tubing through which fluid being monitored flows (i.e., resides). Accordingly, such movement may be implemented in a manner to enable correction of data errors associated with manufacturing tolerances, tubing variabilities, user variability, environmental condition variability, and the like. Such movement may be provided for in any number of ways including, but not limited to, servos, actuators, motors, passive members (e.g., thermally-reactive and/or light sensitive material), and the like.

Mechanical constraints, not requiring sensor detection or the like, may also be used to configure the fluid conduit in an optimal orientation relative to the remainder of the device, from the standpoint of obtaining reliable data. Visual markings on the device, biased mechanical connectors, or instructive methods for users may be used to ensure correct positioning of the tubing, the sensor package, and the body of the patient relative to one another. Specifically, the positioning of the tubing and device relative to the gravitational axis and the floor is important. For example, the orientation of the tubing relative to gravity may be important to maintain constant, such as in a vertical orientation, in order to eliminate or minimize the effects of sedimentation or precipitation on the spectrophotometric data. Furthermore, in cases where a passive gravitational drainage approach is being utilized, such as in the typical CSF drain setup, the height of the fluid collection device (and concordantly the diagnostic device) relative to the patient's body must be fixed, or intentionally adjusted in a controlled fashion.

Referring now to FIGS. 5A-5D, aspects of a non-invasive fluid diagnostic device 300 in accordance with one or more embodiments of the disclosures made herein is discussed. The fluid diagnostic device 300 provides for adjustability to accept drain lines of different sizes (i.e., cross-sectional sizes). The fluid diagnostic device 300 of FIGS. 5A-5D may be a specific embodiment of the fluid diagnostic device 100 discussed above in reference to FIGS. 1-3. For example, in a similar or different manner, the fluid diagnostic device 300 of FIGS. 5A-5D may provide diagnostic functionalities as discussed above in reference to the fluid diagnostic device 100. The fluid diagnostic device 300 is considered herein to be of the non-invasive type as its use does not require breach of a regulatory (e.g., FDA) approved drain line for in-line attachment of the fluid diagnostic device 300 or flow of a bodily fluid being assessed through a dedicated tubular conduit (e.g., tubing) of the fluid diagnostic device 300. In this respect, the fluid diagnostic device 300 is an adjustable, non-invasive fluid diagnostic device.

The fluid diagnostic device 300 includes a main housing 302, a housing cover 304, an adjustor body 306, adjustor springs 308, a sensor assembly 310 and a diagnostics circuitry 312. The diagnostics circuitry 312 is mounted on the main body 302 (e.g., within an interior space thereof) and provides for diagnostic functionalities such as discussed above in reference to FIGS. 1-3. More specifically, the diagnostics circuitry 312 may include components for determining responsive action and data characterizing such responsive action, may enable spectrophotometry (e.g., light emitting or reception function for spectrophotometry), may provide for other sensing functionality such as one or more sensors that enable assessment in regard to fluid flow rate (e.g., a flow sensor), fluid turbidity (e.g., a fluid clarity sensor), fluid aeration (e.g., a sensor detecting bubbles and similar conditions), fluid pressure (e.g., a strain gauge), fluid constituent component(s) (e.g., chemo sensor, glucose sensor or the like), and the like.

Figure 5A:
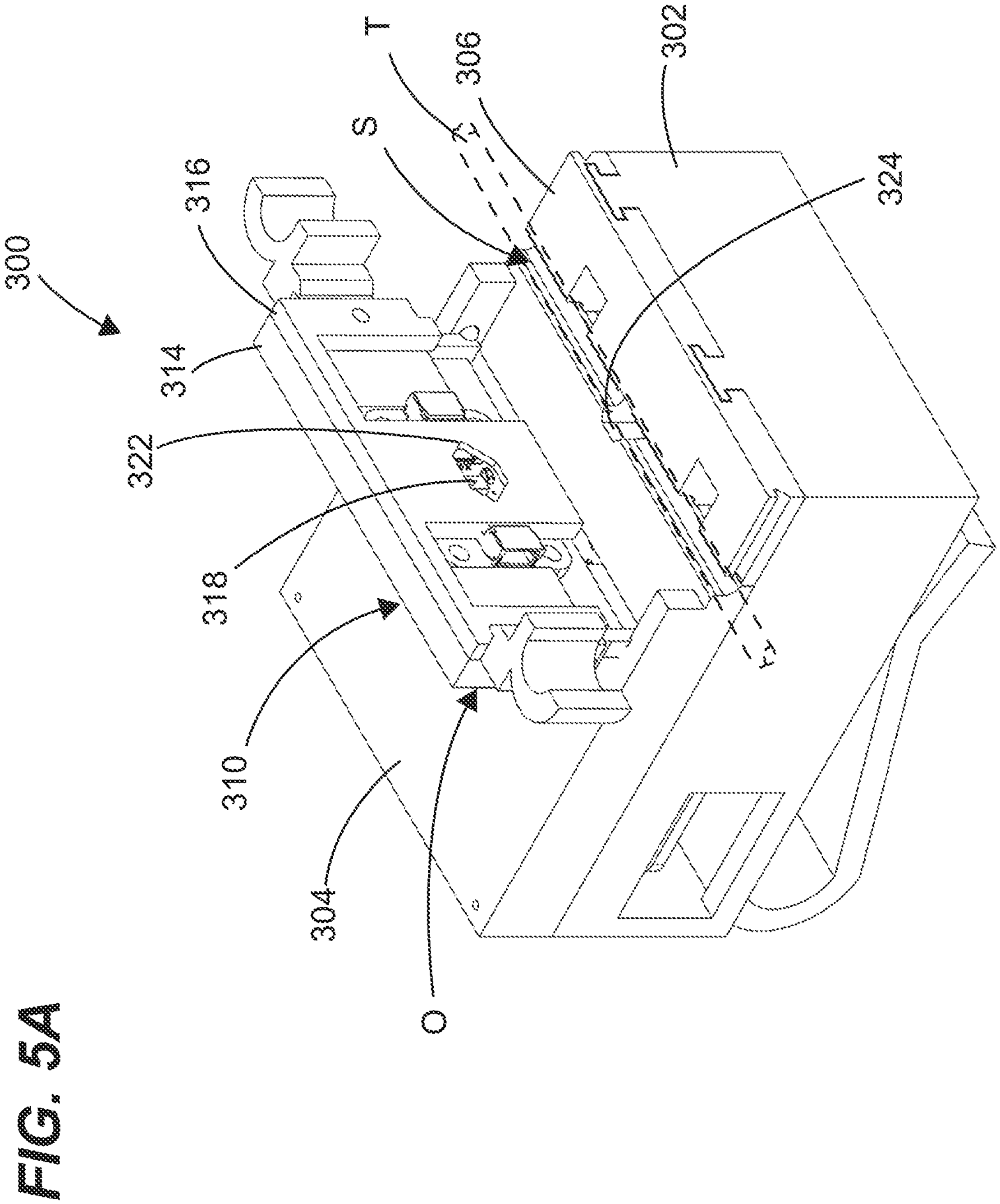
FIG. 5A is an assembly view of an adjustable, non-invasive fluid diagnostic device in accordance with one or more embodiments of the disclosures made herein.
Figure 5B:
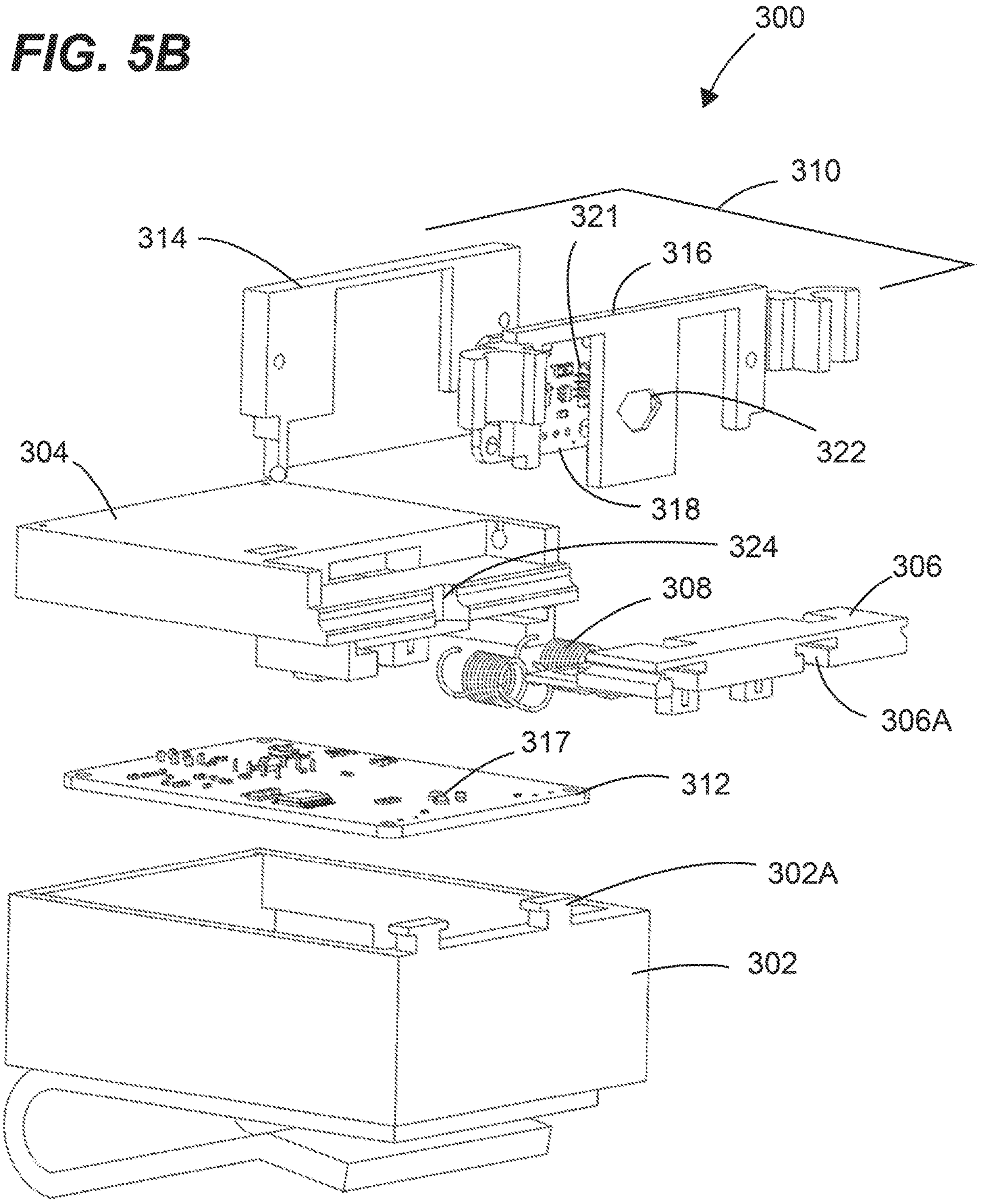
FIG. 5B is an exploded view of the non-invasive fluid diagnostic device of FIG. 5A.
Figure 5C:
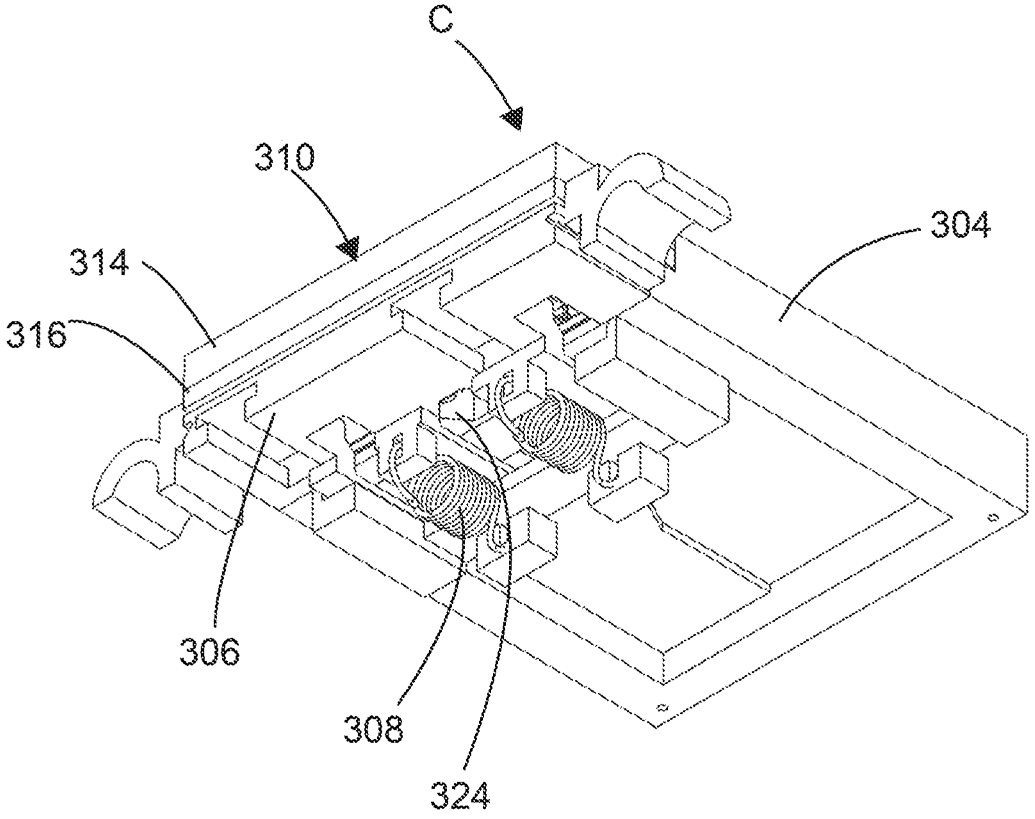
FIG. 5C is a perspective view of a sensor assembly and adjustable tubing receiving channel of the non-invasive fluid diagnostic device of FIGS. 5A and 5B.

The housing cover 304 is mounted on main body 302 (e.g., covering the interior space thereof). The adjustor body 306 (i.e., a first tubular conduit constraining body) is moveably (e.g., slidably) engaged with the main body 302 (i.e., a second tubular conduit constraining body) via mating engagement features 302A and 306A that jointly enable controlled movement of the adjustor body 306 relative to the housing cover 304 (i.e., a second tubular conduit constraining body). Such movement of the adjustor body 306 relative to the housing cover 304 provides for a corresponding change in width of a tubing-receiving space S defining a channel that receives a length of tubing T of a fluid drain (i.e., a tubing-receiving channel of the fluid diagnostic device 300). Reference axis V in FIG. 5A represents an axis which may be maintained in a vertical orientation in order to eliminate or minimize the adverse effects of fluid content such, for example, sedimentation, precipitation, and the like on the spectrophotometric data. As best shown in FIG. 5C, the adjustor spring(s) 308 (i.e., optionally one as opposed to a plurality) serve to bias the adjustor body 306 toward the housing cover 304. The tubing-receiving space S (e.g., a channel) may be defined by respective contoured features (e.g., beveled or radiused edges) of the housing cover 304 and the adjustor body 306.

A skilled person will appreciate other approaches for providing tubing size adjustability—e.g., a threaded mechanism for enabling continuous adjustment of the adjustor body 306 over a range of adjustment relative to the housing cover 302, a set of spaced-apart positioning structures for enabling discrete adjustment of the adjustor body 306 relative to the housing cover 302 and the like. Similarly, a skilled person will appreciate that a non-adjustable version of such a device may be achieved by mounting the adjuster body 306 in a fixed position relative to the housing cover 304.

The sensor assembly 310 includes an upper body 314, a lower body 316 and sensor circuitry 318. The upper body 314 and the lower body 316 jointly house the sensor circuitry 318. The sensor assembly 310 is electrically coupled to the diagnostics circuitry 312 for enabling communication of information (e.g., numeric data) therebetween and is moveably coupled to the main body 302. For example, as shown, the upper body 314 of the sensor assembly 310 is pivotably attached to the housing cover 304 for enabling movement between an open position O and a closed position C relative to the adjustor body 306. In this respect, the sensor assembly 310 may be opened and closed to permit placing a length of tubing into the tubing-receiving space S and removing the length of tubing from within the tubing-receiving space S. In the closed position C, the housing cover 302, the lower body 316 of the sensor assembly 310 and the adjustor body 306 jointly capture and retain the length of tubing in a fixed position and orientation relative to the sensor circuitry 318. In doing so, the length of tubing may be maintained in a fixed position and orientation relative to one or more light emitters 317 and one or more light receptors 321. Preferably, the housing cover 302, the adjustor body 306 and/or the sensor assembly 310 is configured to limit unintentional movement of the length of tubing within the tubing-receiving space S while the sensor assembly 310 is in the closed position C.

Figure 5D:
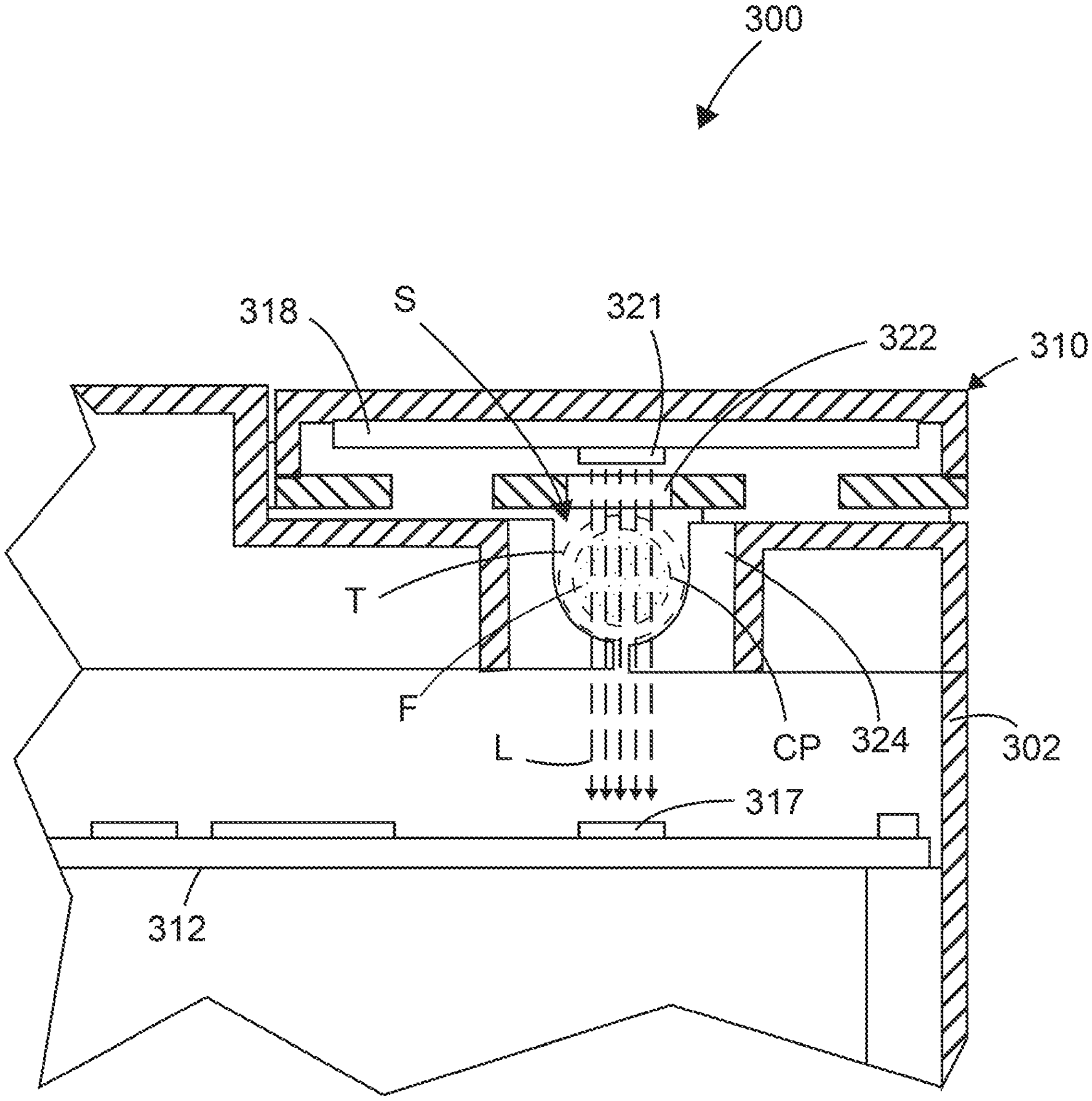
FIG. 5D is a fragmentary cross-sectional view showing spectrophotometry functionality of the non-invasive fluid diagnostic device of FIGS. 5A and 5B.

As best shown in FIG. 5D, the one or more light emitters 317 and the one or more light receptors 321 are attached to opposing ones of the lower body 316 of the sensor assembly 310 and the diagnostics circuitry 312, thereby allowing light from the one or more light emitters 317 to pass through the tubing T and fluid therein (where no fluid may be within the tubing for calibration purposes) prior to being received by the one or more light receptors 321 of the sensor circuitry 318. The one or more light receptors 321 generate a signal characterizing aspects of the fluid within the tubing T (e.g., constituent components, biomarkers and the like). In preferred embodiments, the light receptors 321 are configured to receive light in the wavelength range of about 350 nm to about 1200 nm, which is preferred for detecting certain biomarkers in bodily fluid (e.g., constituent components of blood in CSF). The one or more light emitters 317 and the one or more light receptors 321 have line of sight visibility to each other through a passage 322 in the lower body 316 of the sensor assembly 310 and a passage 324 in the cover body 304.

Light L emitted from the one or more light emitters 317 passes through the tubing T and fluid within a central passage CP of the tubing T thereby providing a transmissive spectrophotometric optical system for non-invasive analysis of bodily fluid flowing or otherwise residing within the tubing T. The sensor circuitry 318 and associated components of the diagnostics circuitry 312 (e.g., the one or more light emitters 317) may jointly define a spectrophotometry sensor or the like. Preferably, the housing cover 302, the adjustor body 306 and the sensor assembly 310 are jointly configured to limit, if not preclude, the one or more light receptors from exposure to ambient light.

In operation, the sensor circuitry 318 and associated components of the diagnostics circuitry 312 jointly operate to generate numerical outputs as a function of one or more wavelengths of reference the light L emitted by the light emitters 317 (i.e., one or more reference light sources) that pass through the fluid F within the central passage CP of the tubing T. The diagnostics circuitry 312 includes components that execute instructions to perform diagnostic functionalities associated with the fluid passing through the tubing T. Execution of these instructions, which may be by one or more components of the diagnostics circuitry 312 (e.g., a functionality control module), enable at least the following functionalities to be performed: receive sensor information generated by the spectrophotometry sensor, analyze sensor information to determine when a fluid condition characterized by an amount of the biomarker within the fluid, and cause, in response to a prescribed fluid condition being present, transmission of a signal from the fluid diagnostic device for reception by a remote system operable to carry out a responsive action derived as a function of the fluid condition. The operative action may include display of information, output of information, outputting of a control signal, or a combination thereof.

Figure 6A:
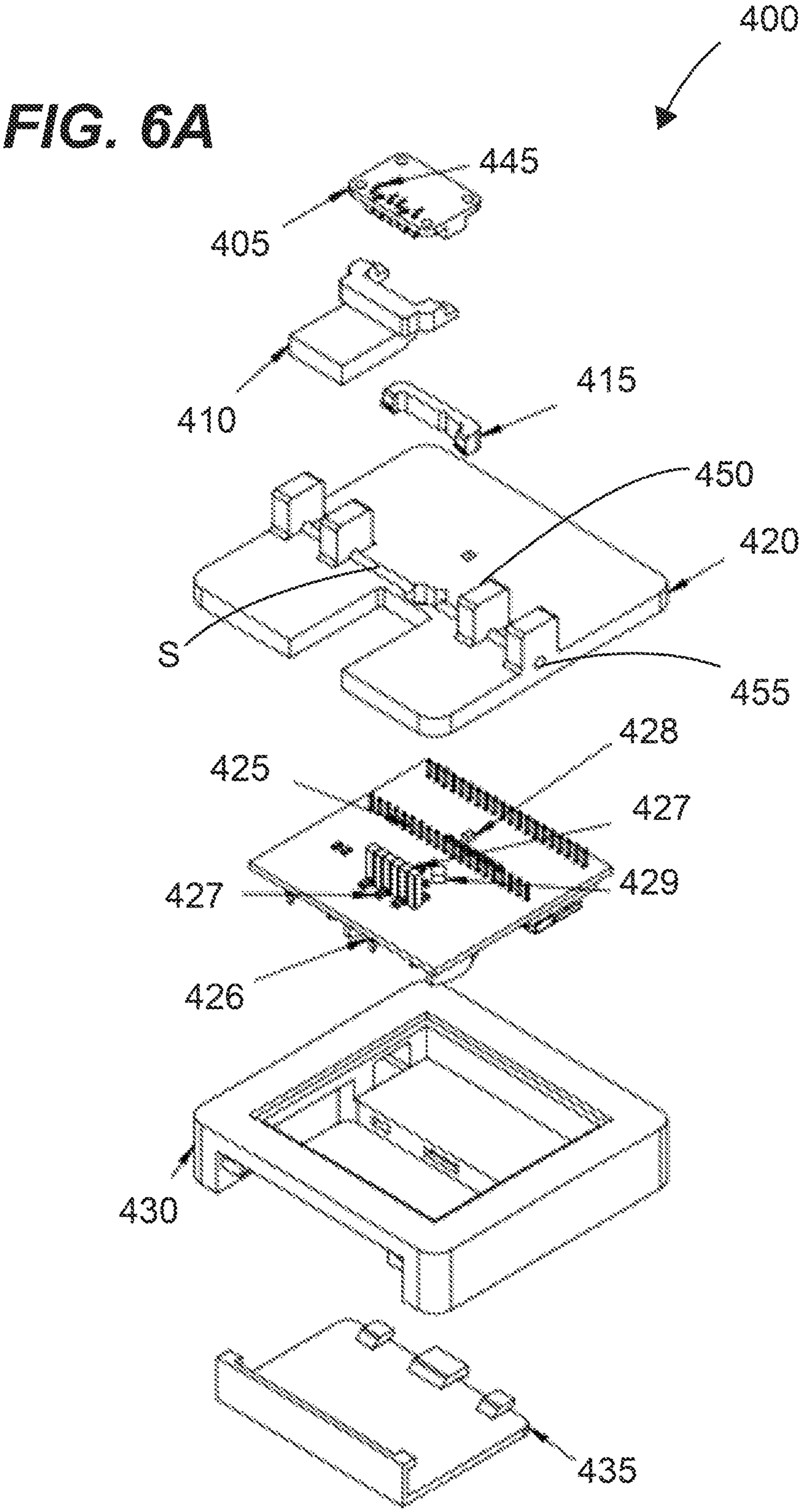
FIG. 6A is an exploded view of a non-adjustable, non-invasive fluid diagnostic device in accordance with one or more embodiments of the disclosures made herein.
Figure 6B:
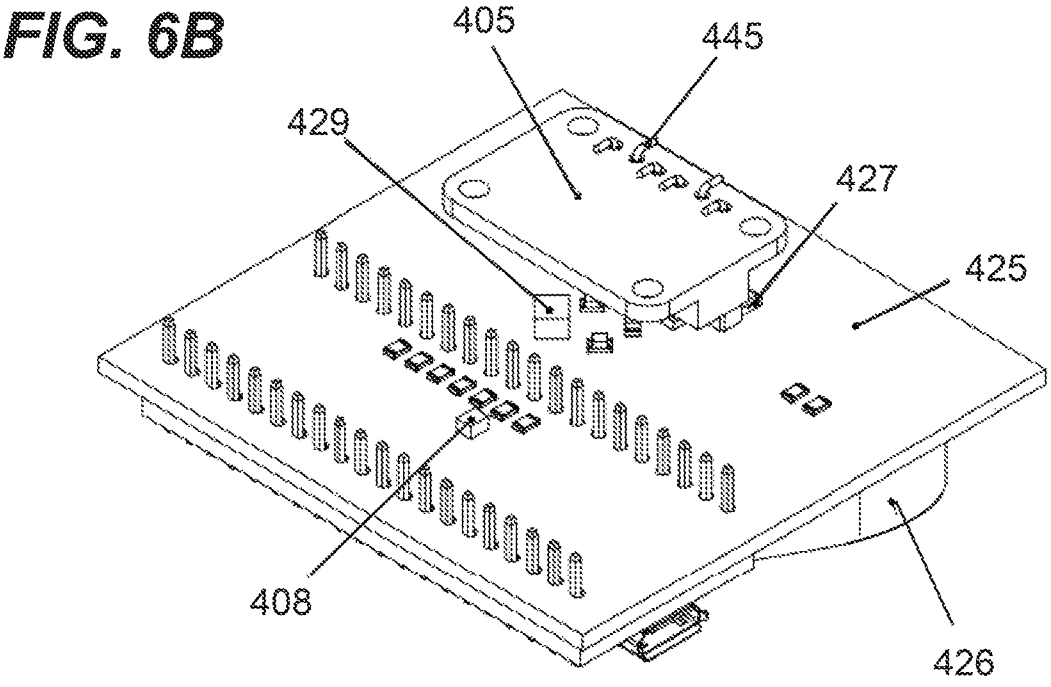
FIG. 6B is a perspective view showing a first side of a circuit board of the non-adjustable, non-invasive fluid diagnostic device of FIG. 6A.
Figure 6C:
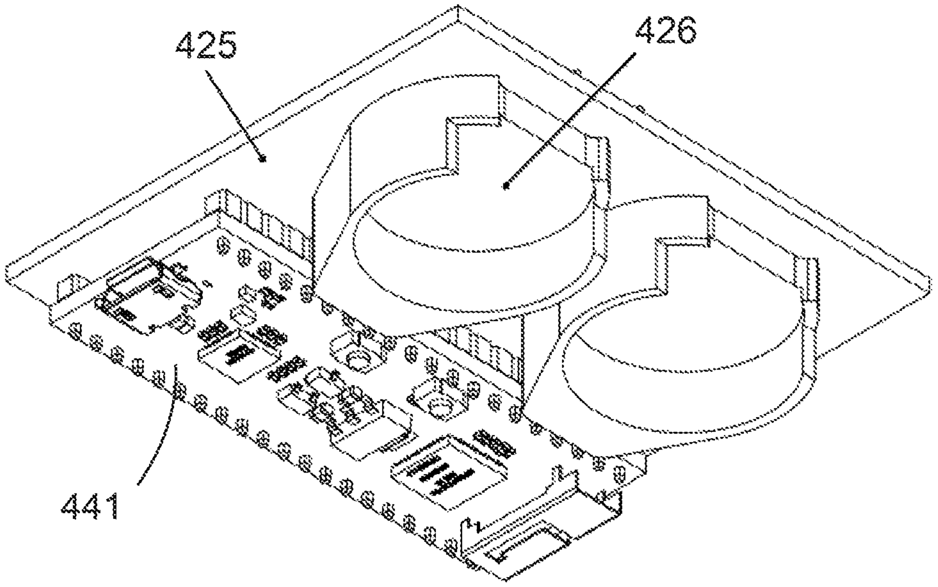
FIG. 6C is a perspective view showing a second side of the circuit board of the non-adjustable, non-invasive fluid diagnostic device of FIG. 6A.

FIG. 6 shows a non-adjustable, non-invasive fluid diagnostic device 400 in accordance with one or more embodiments of the disclosures made herein. Here, non-adjustable refers to not being actively or selectively adjustable for different size drain tubes. The fluid diagnostic device 400 is considered herein to be of the non-invasive type as its use does not require breach of a regulatory (e.g., FDA) approved drain line or flow of a bodily fluid being assessed through a dedicated tubular conduit (e.g., tubing) of the fluid diagnostic device 400. Aside from its non-adjustability, the overall fluid diagnostic capability of the fluid diagnostic device 400 may be the same or similar (i.e., functionally equivalent) to that of the aforementioned fluid diagnostic device 100 and/or fluid diagnostic device 300.

The fluid diagnostic device 400 includes a spectrophotometric sensor assembly (e.g., package) 405, a back plate 410, a front plate 415, a top plate 420, a circuit board 425, a lower housing 430, and a battery cover 435. The battery cover 435 engages the lower housing 430 to cover an opening within a surface of the lower housing 430 through which one or more batteries may be installed into an interior space 440 of the lower housing 430. The circuit board 425 may include a controller 441 that includes discrete components equivalent or similar in function to those of the microcontroller 154 discussed above in reference to FIGS. 3A and 3B. The controller 441 may include non-transitory computer-readable medium carrying a series of processor-executable instructions enabling the controller to serve as an FCM in accordance with embodiments of the disclosures made herein. In this regard, the controller 441 may provide the similar or the same sensor functionality (i.e., fluid diagnostics functionality and sensor functionality as the device 100 discussed above in reference to FIGS. 1-3B and/or the diagnostics circuitry 312 discussed above in reference to FIGS. 5A-5C). The circuit board 425 may include one or more battery holders 426 for enabling the supply of electrical power to the electrical components of the fluid diagnostic device 400.

An indicator light 428 may be provided for providing a visual indication of operation. The spectrophotometric sensor assembly 405 may include a set of header pins 445 for connecting the spectrophotometric sensor assembly 405 to associated components of the circuit board 425. Electrical connections 427 (e.g., soldered points) provide for electrical contact with header pins 428 on the circuit board 425. The header pins 428 electrically connect the spectrophotometric sensor assembly 405 to electronics of the circuit board 425. The circuit board 425 may include a light emitter 429 (e.g., a light emitting diode) operable to emit light within a defined wavelength range, where such light is transmitted for reception by a correspondingly configured light receptor (e.g., sensor) of the spectrophotometric sensor assembly 405 for enabling continuous optical measurement (e.g., spectrophotometry) of fluid within tubing.

The top plate 420, the back plate 410, the front plate 415 and the spectrophotometric sensor assembly 405 jointly serve to fixedly position a length of tubing and to mitigate exposure of a portion of the tubing being exposed to spectrophotometric to ambient light. Specifically, the top plate 420 includes tubing retainers 450 having passages 455 through which a length of tubing extend and a tubing-receiving space S, within which the length of tubing lies, extending between adjacent ones of the tubing retainers 450. The back plate 410, the front plate 415 and the spectrophotometric sensor assembly 405 are jointly configured such that the back plate 410 and the front plate 415 follow the contour of the spectrophotometric sensor assembly 405 to house (fully or partially) the spectrophotometric sensor assembly 405, to secure a central section of the tubing in a fixed position and to shroud the central section of the tubing from ambient light. In view of the disclosures made herein, a skilled person will appreciate alternative modalities for the fastening of the tubing such as, for example, clamping, locking, or pressing.

Figure 7A:
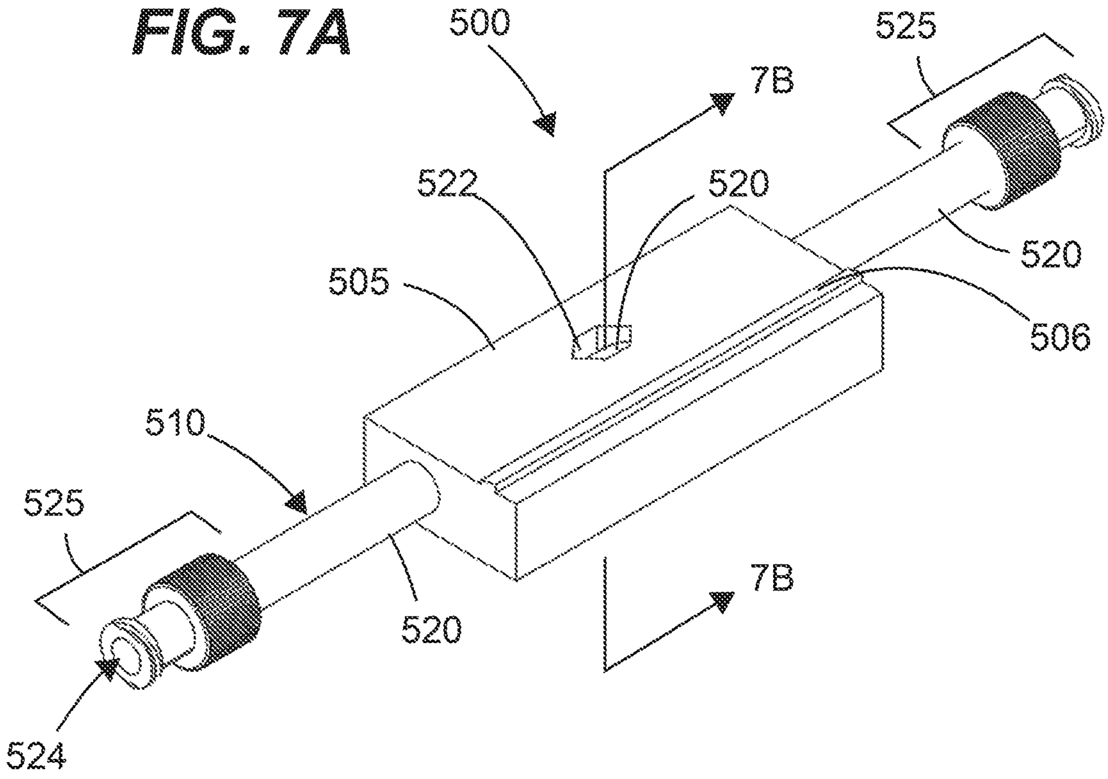
FIG. 7A is a perspective view showing a minimally-invasive fluid diagnostic module configured in accordance with a first embodiment of the disclosures made herein.
Figure 7B:
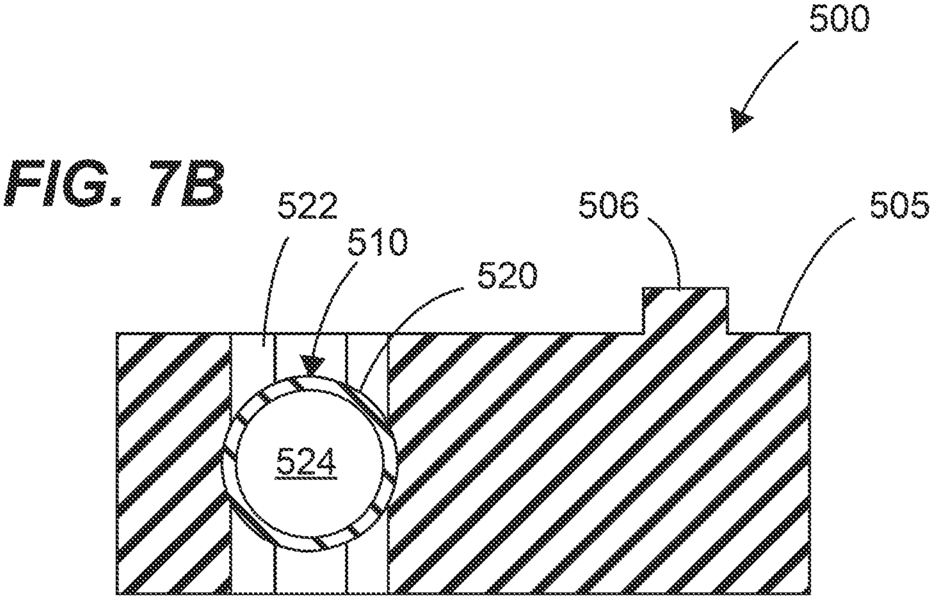
FIG. 7B is a cross-sectional view taken at the line 7B-7B in FIG. 7A.

FIGS. 7A and 7B show a module configured in accordance with a first embodiment of the disclosures made herein to enable fluid diagnostics functionality in a minimally-invasive manner (minimally-invasive fluid diagnostic module 500). The minimally-invasive fluid diagnostic module 500 includes a main body 505 and, a tubing (i.e., a tubular conduit) coupler 510. The main body includes an alignment member 506 (i.e., a first alignment feature). The tubing coupler 510 includes a length of tubing 520 with couplers 525 (e.g., Luer Lock couplers) attached to opposing ends of the tubing 520. The coupled 525 enable attachment of the tubing 520 to a drain tubing, preferably in an in-line manner. In preferred embodiments, the tubing 520 is resilient tubing of known material and physical specifications and strain is computed as a function of strain gauge output and such known material and physical specifications.

The main body 505 may include a passage 522 extending therethrough for enabling light to be transmitted through the tubing 510 for enabling spectrophotometry determination of biomarkers by a spectrophotometry sensor assembly external to the minimally-invasive fluid diagnostic module 500. Optionally, a spectrophotometry sensor assembly may be integrated into the main body 505 of the minimally-invasive fluid diagnostic module 500.

Figure 7C:
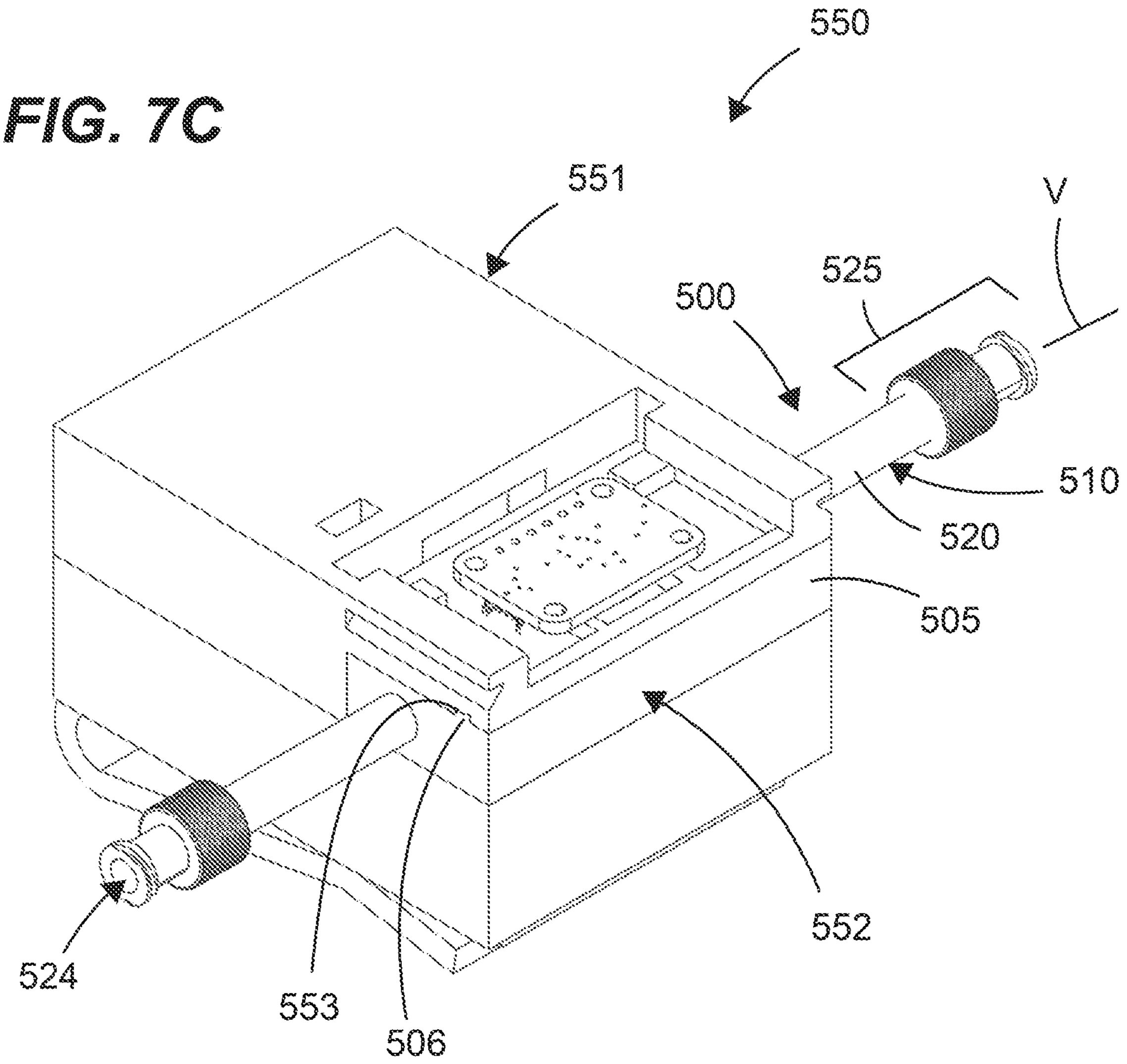
FIG. 7C is a perspective view showing a minimally-invasive diagnostic device in accordance with embodiments of the disclosures made herein, where the minimally-invasive diagnostic device incorporates a minimally-invasive fluid diagnostic module configured in accordance with one or more embodiments of the disclosures made herein.

Referring now to FIG. 7C, aspects of a minimally-invasive fluid diagnostic device 550 in accordance with one or more embodiments of the disclosures made herein is discussed. The minimally-invasive fluid diagnostic device 550 includes a diagnostic unit 551 and the minimally-invasive fluid diagnostic module 500. The minimally-invasive fluid diagnostic module 500 is one example of a minimally-invasive fluid diagnostic module that may be used with a diagnostic unit in accordance with the disclosures made herein (e.g., the diagnostic unit 551). Reference axis V represents an axis which may be maintained in a vertical orientation in order to eliminate or minimize the adverse effects of fluid content such, for example, sedimentation, precipitation, and the like on the spectrophotometric data. From a diagnostic operability perspective (e.g., electrical and electronics components), the diagnostic unit 551 may operate in the same or a generally similar manner (i.e., may be functionally equivalent) to the non-invasive fluid diagnostic device 300 discussed above in reference to FIGS. 5A-5D. Additionally, a FCM of the fluid diagnostic device 550 may be functionally-equivalent to a FCM of the non-invasive fluid diagnostic device 300. As such, in view of the disclosures made herein, it is disclosed herein that a skilled person will understand the diagnostic operability of the minimally-invasive fluid diagnostic device 550 and no further discussion of such diagnostic operability of the diagnostic unit 551 is provided herein.

The diagnostic unit 551 has a module-receiving space 552 within which the main body 505 of the minimally-invasive fluid diagnostic module 500 is located during operation of the minimally-invasive fluid diagnostic device 550. The alignment member 506 of the minimally-invasive fluid diagnostic module 500 is engaged with a mating alignment channel 553 (i.e., a second alignment feature) of the diagnostic unit 551 for ensuring spatial positioning of the minimally-invasive fluid diagnostic module 500 within the module-receiving space 552 of the diagnostic unit 551. The diagnostic unit 551 and the minimally-invasive fluid diagnostic module 500 may include mating positioning features that provide for positive positioning of the passage 522 of the minimally-invasive fluid diagnostic module 500 relative to the diagnostic unit 551 for enabling spectrophotometry or type(s) of optical-based diagnostics functionality.

Figure 7D:
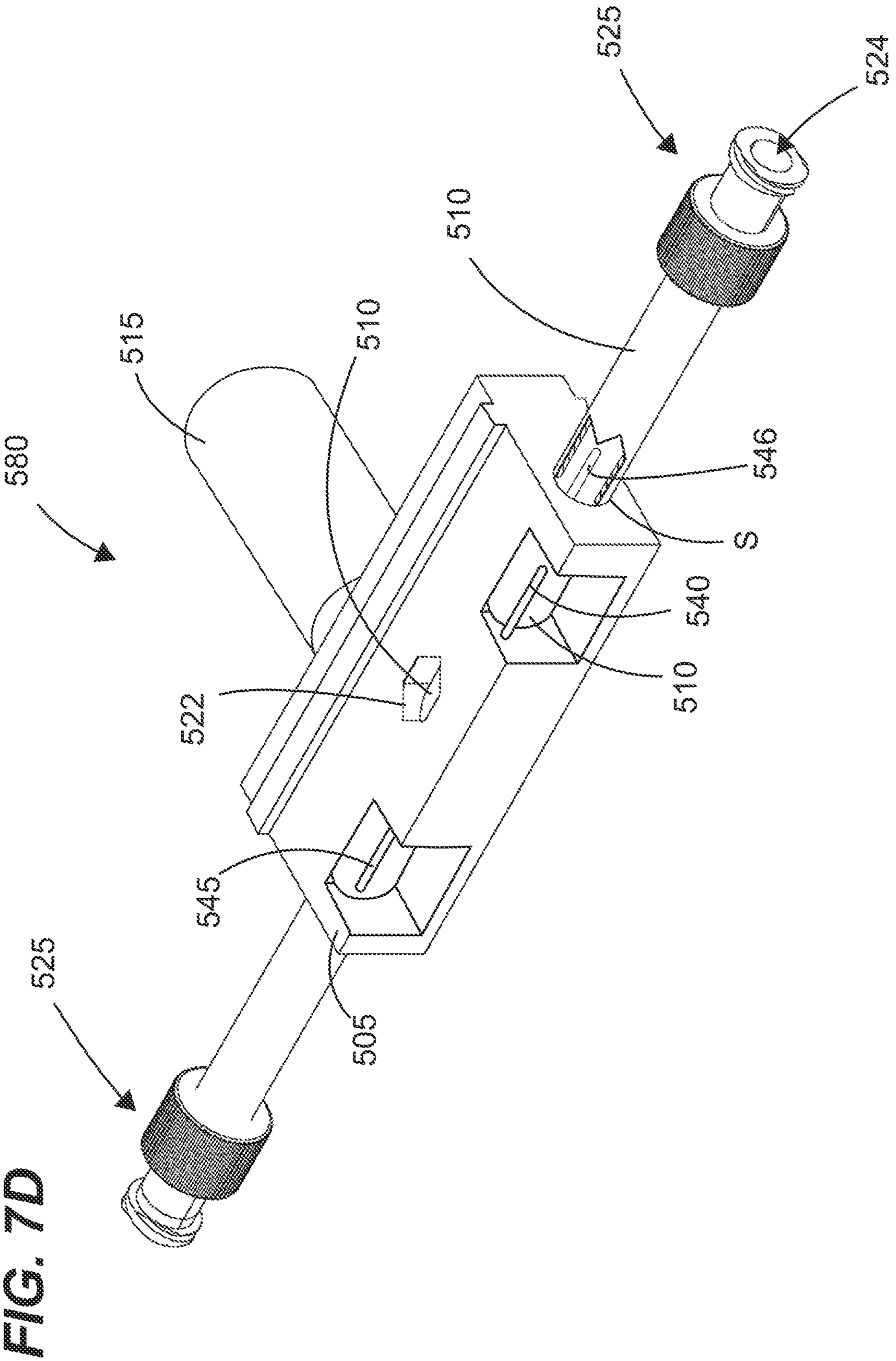
FIG. 7D is a perspective view showing a minimally-invasive fluid diagnostic module configured in accordance with a second embodiment of the disclosures made herein.

FIG. 7D shows a diagnostic module configured in accordance with a second embodiment of the disclosures made herein to provide fluid diagnostics in a minimally-invasive manner (minimally-invasive fluid diagnostic module 580). The minimally-invasive fluid diagnostic module 580 includes a main body 505, a tubing (i.e., a tubular conduit) coupler 510 and a flow shut-off 515. The tubing coupler 510 includes a length of tubing 520 with couplers 525 (e.g., Luer Lock couplers) attached to opposing ends of the tubing 520. The coupled 525 enables attachment of the tubing 520 to a drain tubing, preferably in an in-line manner. In preferred embodiments, the tubing 520 is resilient tubing of known material and physical specifications and strain is computed as a function of strain gauge output and such known material and physical specifications.

The tubing 520 lies within a tubing-receiving space S of the main body 505. The main body 505 may include a passage 522 extending therethrough for enabling light to be transmitted through the tubing coupler 510 for enabling spectrophotometry determination of biomarkers by a spectrophotometry sensor assembly external to the minimally-invasive fluid diagnostic module 580. Optionally, a spectrophotometry sensor assembly may be integrated into the main body 505 of the minimally-invasive fluid diagnostic module 580.

The flow-shut-off 515 is engaged with the main body 505 to permit a portion of the flow shut-off to come into contact with the tubing 520 in a manner that allows a portion of the flow shut-off to move for enabling the flow of fluid through the tubing 520 to be selectively inhibited. In some embodiments, inhibiting fluid flow is a result of the flow shut-off 515 sufficiently deforming the tubing 520 to close off an interior passage of the tubing 520. To achieve optimal fluid pressure, flow of fluid may be temporarily or momentarily inhibited using the flow shut-off 515, which may be of any suitable configuration for providing the required functionality. In one or more other embodiments, the flow shut-off 515 may include a valve (e.g., solenoid controlled) for selectively inhibiting fluid flow through the tubing 520. The flow shut-off 515 is preferably configured in a manner enabling fluid flow to be momentarily halted to allow a pressure measurement to be quickly taken via the on-boarded pressure sensors.

The minimally-invasive fluid diagnostic module 580 preferably includes a plurality of sensors that each provide a respective sensing functionality. As shown, the minimally-invasive fluid diagnostic module 580 includes a pressure sensor 540 and an ancillary sensor 545. The pressure sensor 540 may be in the form of a strain gauge attached to an exterior surface of the tubing 520 or otherwise implemented. The ancillary sensor 545 may be similarly attached to the exterior surface of the tubing 520 or otherwise implemented. The ancillary sensor 545 may be a temperature sensor, fluid flow sensor (e.g., ultrasonic sensor), or the like. Each sensor of the minimally-invasive fluid diagnostic module 580 outputs a respective signal indicative of the associated parameter—i.e., fluid pressure and temperature. The flow shut-off 515, the pressure sensor 540 and the ancillary sensor 545 may be coupled to a controller within the main body 505 which serves as a FCM and may be interfaced with the control circuitry via a one or more electrical connectors or otherwise.

In one or more embodiments, the minimally-invasive fluid diagnostic module 580 may include a fluid-contacting sensor 546 or a plurality of such fluid-contacting sensors. The fluid-contacting sensor 546 has a sensing portion thereof exposed within a central passage 524 of the tubing T. The fluid-contacting sensor 546 outputs a signal characterizing one of more aspects of fluid with the central passage 524 of the tubing T. Examples of fluid-contacting sensors include, but are not limited to, chemo sensors, glucose sensors, temperature sensors, and the like.

The minimally-invasive fluid diagnostic module 580 may be configured as a standalone device (i.e., providing full diagnostic functionalities including responsive action signaling in a dedicated housing) or as a modular device that integrates with another piece of equipment to provide full diagnostic functionalities (e.g., the diagnostic unit 551). Regardless of particular implementation, the minimally-invasive fluid diagnostic module 580 would be configured for enabling isolation of the sampling region of the tubing from ambient light. For example, the minimally-invasive fluid diagnostic module 580 may include a mating light-shielding housing with which the main body 505 is engaged during use.

Figure 8:
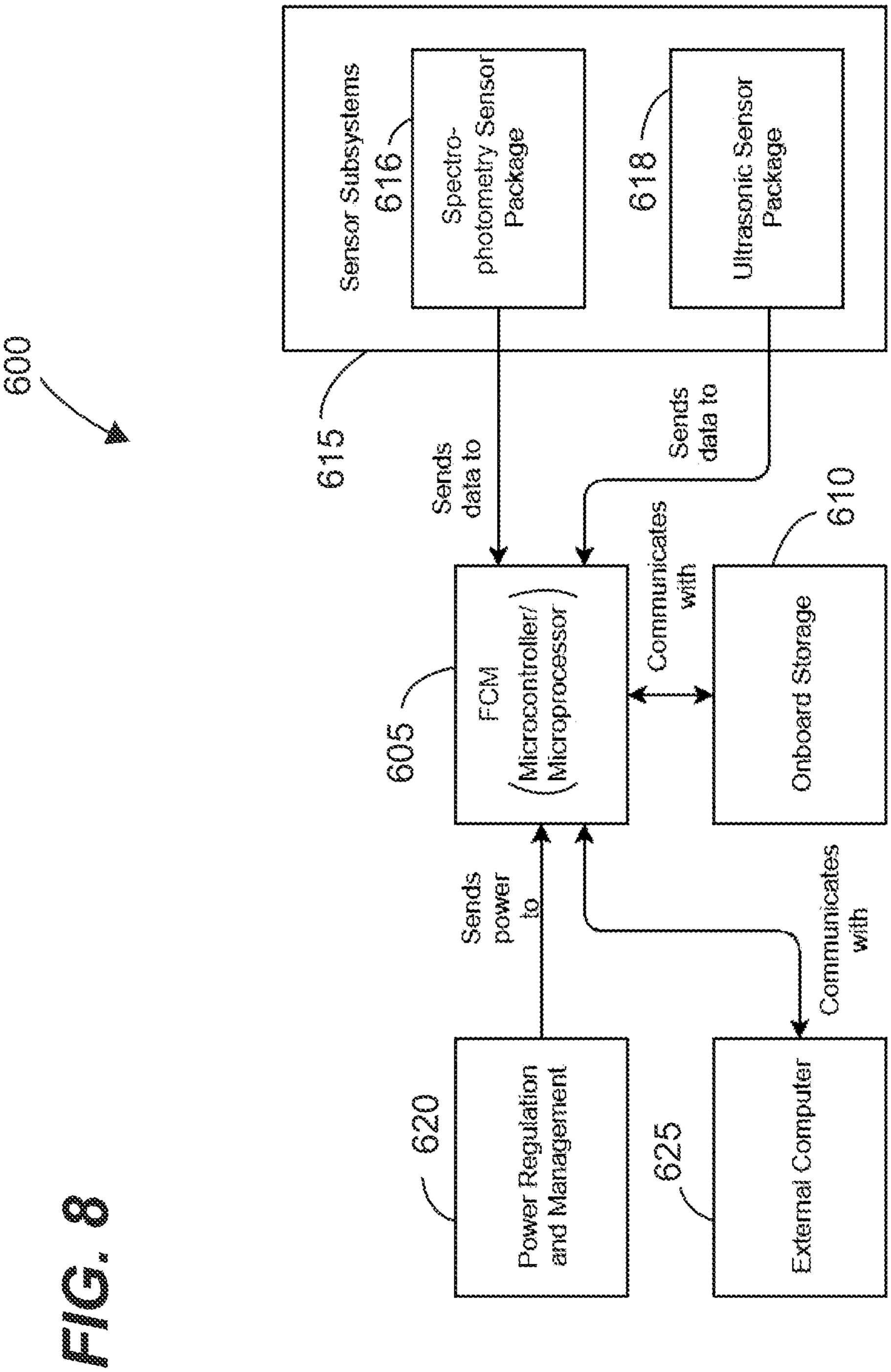
FIG. 8 is a diagrammatic view showing main components of a diagnostic system in accordance with embodiments of the disclosures made herein.

Referring to FIG. 8, a functional block diagram showing main components of a diagnostic system 600 in accordance with embodiments of the disclosures made herein are shown. The diagnostic system 600 includes a functionality control module (FCM) 605 is connected to the onboard storage 610, the spectrophotometry sensor 616, the ultrasonic sensor 618, the PMS 620 and the external computer system 625 for enabling interoperability therebetween. The FCM 605, the onboard storage 610, the spectrophotometry sensor 616, the ultrasonic sensor 618 and PMS 620 may be that of a fluid diagnostic device configured in accordance with one or more embodiments of the disclosures made herein. The computer 625 may be connected to the fluid diagnostic device via a known interface (e.g., a USB interface)

The device is controlled by the FCM 605, which executes a series of instructions configured for providing fluid diagnostic functionalities. Power is provided to the system via the PMS 620. The processor FCM 605 accesses the instructions from memory and may be a microprocessor-based FCM. The instructions may be stored in the memory via external processing system (e.g., a computer) through a communications interface (e.g., a USB interface) using a software application. When configured, the FCM 605 receives data from the sensors 616, 618 (e.g., a spectrophotometry sensor and a fluid pressure package). The FCM 605 processes the data and converts it into a readable format, which then may be either stored onto the onboard storage 610 for future retrieval or sent to the external computer 625 to download and visualize. The data may also be used to generate output information suitable for indicating a responsive action and information used in determining the responsive action.

Diagnostic systems as disclosed herein (and devices thereof) may comprise a USB port for communicating with external devices like clinician PCs or USB flash drives in a simple manner. These systems may also have the ability to enable efficient wireless communication capabilities by connecting to a low-power wide-area network (LPWAN) using protocols like LoRa (LOng-RAnge) or Thread, the latter of which is associated with the burgeoning Matter smart home technology. This latter functionality opens the possibility of integrating this device into other fluid drain monitoring applications in nursing homes and personal residences. A web or software application may monitor the status of disclosed devices from a remote computer or phone (i.e., a remote system) without needing to be physically present.

Figure 9:
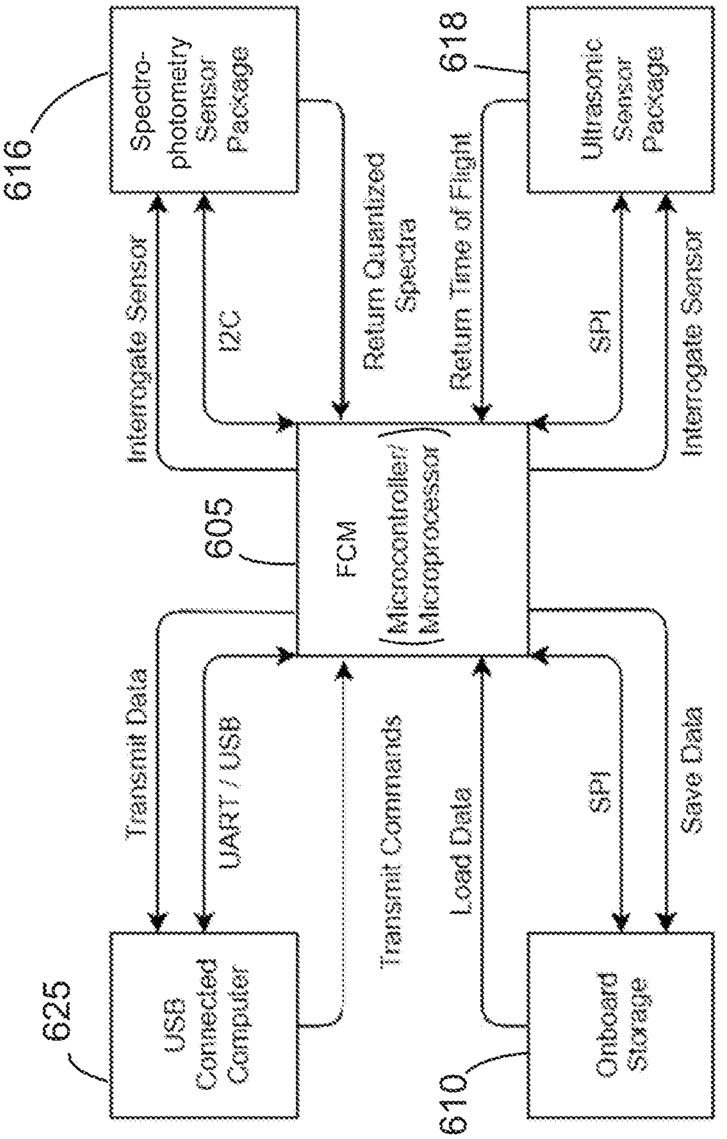
FIG. 9 is a diagrammatic view showing data flow as related to protocols and data communicated between components of the diagnostic system of FIG. 8.

Referring now to FIG. 9, a data flow graph shows an embodiment of protocols and data communicated between components of the diagnostic system 600 discussed above in reference to FIG. 8. The computer 625 may communicate either via UART (the device appears as a COM port to the computer) or as a USB custom human interface device (HID) device. The computer 625 may send commands to configure the FCM 605 or to request data, whereby the FMC 605 then attempts to fulfill the request. The FCM 605 will also send interrupt trigger signals to the spectrophotometry sensor 616 and to the ultrasonic sensor 618. Upon receiving these signals, each sensor 616, 618 will wake up from low power mode, execute their respective sensing procedures, and return unprocessed (e.g., raw) data in the form of quantized color channel intensities and time of flight pulse times. The FCM 605 will process the data by filtering and evaluating it. The FCM 605 may then decide to store the processed data onto onboard memory 610, send the processed data to the computer 625, or attempt to resample the sensors 616, 618.

As can be seen from the disclosures made herein, systems, devices, methods, and computer-readable media in accordance with embodiments of the disclosures made herein may utilize a set of sensors to monitor various patient biomarkers. Catheter tubing is inserted (or incorporated) into the device enclosure and these sensors onboard the device may send input data to a computer or, in self-contained services, retain, and process all data onboard. In this regard, the data generated by the device is analyzed to determine quantifiable observations. These observations can then be acted upon via responsive actions by the device or transmitted to a clinician for further analysis. These diagnostic functionalities enable tracking of therapeutic efficacy, early complication detection, and the ability to engage in optimized treatment protocols that lead to cost savings in the case of clinical management.

Because the device data collection is primarily a passive operation, and sampling does not need to be highly frequent, the devices can run at real-time and at low power, and the data stored can be kept on-device for the duration of the treatment without needing periodic offboarding. This can be especially useful if the device is accidentally disconnected from an external output source or power cable and may need to run independently for a given period of time. However, one of the key benefits of devices configured in accordance with the disclosure made herein is that all of these data collection parameters (i.e. sample rate, sensitivity, specificity) can all be augmented for the indication and bodily fluid under consideration.

Although the invention has been described with reference to several exemplary embodiments, it is understood that the words that have been used are words of description and illustration (show), rather than words of limitation. Changes may be made within the purview of the appended claims, as presently stated and as amended, without departing from the scope and spirit of the invention in all its aspects. Although the invention has been described with reference to particular means, materials, and embodiments, the invention is not intended to be limited to the particulars disclosed; rather, the invention extends to all functionally equivalent technologies, structures, methods, and uses such as are within the scope of the appended claims.

What is claimed is:

1. A fluid diagnostic device, comprising:

a spectrophotometry sensor operable to generate output information as a function of one or more wavelengths of reference light that is emitted by one or more signal emitting portions of the spectrophotometry sensor and that passes through fluid within a length of tubing;

a tubing holder that is configured to secure the length of tubing in a fixed position and orientation relative to the spectrophotometry sensor, wherein the tubular conduit holder includes a first tubular conduit constraining body and a second tubular conduit constraining body, wherein the tubular conduit constraining bodies jointly define a tubular conduit receiving space and wherein at least one of the tubular conduit constraining bodies is movable relative to the other for enabling at a width of the tubular conduit receiving space to be adjustable for accommodating tubular conduits having different outside dimension;

a functionality control module operable to determine a responsive action as a function of at least a portion of the output information, wherein determination of the responsive action is initiated in response to at least a portion of the output information indicating an unacceptable deviation of a current condition of the fluid from a baseline condition of the fluid and wherein the current and baseline conditions of the fluid relate to presence of a biomarker within the fluid;

a strain gauge attached to an exterior surface of the length of tubing, wherein the fluid-carrying portion of the tubular conduit coupler is a length of resilient tubing, wherein the tubular conduit is resilient tubing having known material and physical specifications and wherein the functionality control module computes strain as a function of strain gauge output and the known material and physical specifications;

a tubular conduit coupler that comprises the length of tubing, wherein the tubular conduit coupler is connectable to a fluid conduit of a fluid drain;

a fluid flow shutoff for selectively inhibiting flow of the fluid through the length of tubing; and at least one sensor operable for determining a parameter that arises from the fluid being static within the length of tubing;

wherein at least one of the spectrophotometry sensor and the functionality control module is operable to correlate the at least one wavelength of the light to the parameter characterizing the presence of the biomarker within the fluid.

2. The fluid diagnostic device of claim 1 wherein the functionality control module being operable to determine the responsive action includes the functionality control module being operable to determine at least one of the biomarker not being detectable within the fluid and an amount of the biomarker being below a prescribed threshold.

3. The fluid diagnostic device of claim 1 wherein:

at least one of the spectrophotometry sensor and the functionality control module is operable to detect the biomarker within the fluid; and the functionality control module is coupled to the spectrophotometry sensor for enabling an output signal including information generated by the spectrophotometry sensor to be transmitted therefrom for reception by the functionality control module.

4. The fluid diagnostic device of claim 3 wherein the functionality control module being operable to determine the responsive action includes the functionality control module being operable to determine at least one of the biomarker not being detectable within the fluid and an amount of the biomarker being below a prescribed threshold.

5. The fluid diagnostic device of claim 1 wherein at least one of the spectrophotometry sensor and the functionality control module is operable to detect the biomarker within the fluid.

6. The fluid diagnostic device of claim 5 wherein the functionality control module being operable to determine the responsive action includes the functionality control module being operable to determine at least one of the biomarker not being detectable within the fluid and an amount of the biomarker being below a prescribed threshold.

7. The fluid diagnostic device of claim 1 wherein the functionality control module is coupled to the spectrophotometry sensor for enabling an output signal including information generated by the spectrophotometry sensor to be transmitted therefrom for reception by the functionality control module.

8. The fluid diagnostic device of claim 7 wherein the functionality control module being operable to determine the responsive action includes the functionality control module being operable to determine at least one of the biomarker not being detectable within the fluid and an amount of the biomarker being below a prescribed threshold.

9. The fluid diagnostic device of claim 1 wherein the functionality control module is operable to correlate the at least one wavelength of the light to the parameter characterizing the presence of the biomarker within the fluid.

10. The fluid diagnostic device of claim 9 wherein the functionality control module being operable to determine the responsive action includes the functionality control module being operable to determine at least one of the biomarker not being detectable within the fluid and an amount of the biomarker being below a prescribed threshold.

11. The fluid diagnostic device of claim 1 wherein the spectrophotometry sensor is operable to detect the biomarker within the fluid.

12. The fluid diagnostic device of claim 11 wherein the functionality control module being operable to determine the responsive action includes the functionality control module being operable to determine at least one of the biomarker not being detectable within the fluid and an amount of the biomarker being below a prescribed threshold.

13. The fluid diagnostic device of claim 12 wherein the functionality control module being operable to determine the responsive action includes the functionality control module being operable to determine at least one of the biomarker not being detectable within the fluid and an amount of the biomarker being below a prescribed threshold.

14. The fluid diagnostic device of claim 12 wherein the functionality control module is operable to correlate the at least one wavelength of the light to the parameter characterizing the presence of the biomarker within the fluid.

15. The fluid diagnostic device of claim 14 wherein the functionality control module being operable to determine the responsive action includes the functionality control module being operable to determine at least one of the biomarker not being detectable within the fluid and an amount of the biomarker being below a prescribed threshold.

* * * * *